United States Patent [19]

Yoshitomi

[11] Patent Number: 5,715,461
[45] Date of Patent: Feb. 3, 1998

[54] SYSTEM FOR MANAGING SOFTWARE DEVELOPMENT IN DISTRIBUTED DEVELOPMENT ENVIRONMENT

[75] Inventor: Yoriko Yoshitomi, Kawasaki, Japan

[73] Assignee: Fujitsu Limited, Kanagawa, Japan

[21] Appl. No.: 351,720

[22] Filed: Dec. 8, 1994

[30] Foreign Application Priority Data

May 16, 1994 [JP] Japan ................... 6-101023

[51] Int. Cl.⁶ ............................ G06F 9/44; G06F 13/00
[52] U.S. Cl. ............................................... 395/710
[58] Field of Search ....................... 395/650, 700, 395/710

[56] References Cited

U.S. PATENT DOCUMENTS

| | | | |
|---|---|---|---|
| 5,237,688 | 8/1993 | Calvert et al. | 395/700 |
| 5,282,273 | 1/1994 | Ushio et al. | 395/200.01 |
| 5,339,435 | 8/1994 | Lubkin et al. | 395/700 |
| 5,349,663 | 9/1994 | Bailey | 395/700 |
| 5,414,812 | 5/1995 | Filip et al. | 395/700 |
| 5,475,817 | 12/1995 | Waldo et al. | 395/700 |
| 5,491,796 | 2/1996 | Wanderer et al. | 395/700 |
| 5,530,863 | 6/1996 | Hino | 395/700 |
| 5,553,290 | 9/1996 | Calvert | 395/700 |
| 5,581,764 | 12/1996 | Fitzgerald et al. | 395/710 |

Primary Examiner—Kevin A. Kriess
Assistant Examiner—John Q. Chavis
Attorney, Agent, or Firm—Helfgott & Karas, P.C.

[57] ABSTRACT

A system for managing software development in a distributed development environment, divided into personal layers (P) consisting of logical hierarchies for performing work for development and management of individual resources on an individual level, group layers (G) consisting of logical hierarchies for performing work for development and management of subsystem resources by groups receiving the individual resources developed at the personal layers (P), and a master layer (M) consisting of a logical hierarchy for performing work for development and management of integrated project system resources by a project receiving the subsystem resources developed at the group layers (G), which ensures cooperation among the layers and integrates the plurality of resources prepared at a plurality of distributed bases into a single software system, thereby enabling reduction of delays in software development and improvement in the software quality.

8 Claims, 35 Drawing Sheets

SYSTEM FOR MANAGING SOFTWARE DEVELOPMENT IN DISTRIBUTED DEVELOPMENT ENVIRONMENT

BACKGROUND OF THE INVENTION

1. Field of the Invention

The present invention relates to a system for managing software development which constructs a software system by integrating resources prepared at a number of geographically separate points, that is, "physically distributed bases".

In recent years, the development of LAN, WAN, and other networks and the downsizing of computers have made it possible for software developers to work at other decentralized locations. The way software systems are developed is consequently shifting from the old centralized development at a single geographical location to what is called "distributed" development at multiple locations. The present invention is concerned with a system for managing the latter type of software development.

2. Description of the Related Art

In the old system of development at a single location, the state of progress in of the software development project and the resources (software modules etc.) used for the development were able to be centrally managed at that location. Therefore, there were no problems with some resources failing to be provided to developers, some resources failing to be collected from developers, or lack of consistency among resources. An excellent development environment was therefore established.

As mentioned above, however, the way software systems are developed is shifting from the old centralized development at a single point to distributed development at multiple points. Under the distributed system of development, isolated development environments are formed at each of the different points and therefore the resources are managed and development work conducted in a closed fashion at each point. Therefore, there is the problem of resources failing to be distributed to other points or of resources not being collected from other points and of a lack of consistency among resources.

Considerable effort and special knowhow are required to prevent such omissions and to ensure consistency.

Such a system of development leads, first, to the problem of delays in software development projects and, second, the problem of a lower quality of the finally developed software.

SUMMARY OF THE INVENTION

Accordingly, in consideration of the above problems, the present invention has as its object the provision of a system for managing software development in a distributed environment which enables high quality software to be developed without unnecessary delay.

To attain the above object, the present invention provides a system for managing software development divided into "personal layers (P)" consisting of logical hierarchies for performing work for development and management of individual resources on an individual level, "group layers (G)" consisting of logical hierarchies for performing work for development and management of subsystem resources by groups receiving individual resources developed at the personal layers (P), and a master layer (M) consisting of a logical hierarchy for performing work for development and management of integrated project system resources by a project receiving the subsystem resources developed at the group layers (G), which ensures cooperation among the layers and integrates the plurality of resources prepared at a plurality of distributed bases into a single software system. This enables reduction of delays in software development and improvement in the software quality.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Figure 1:
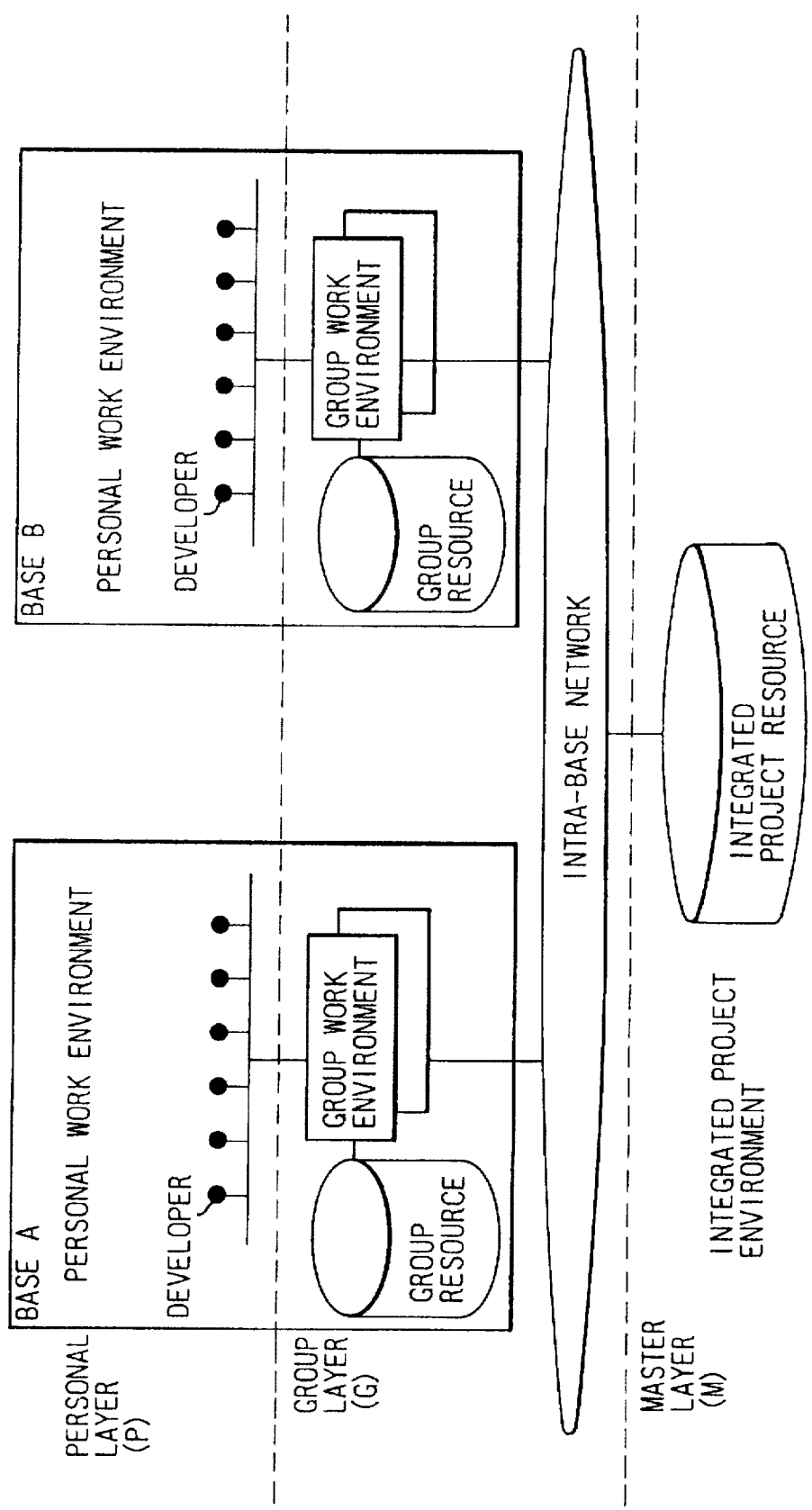
FIG. 1 is a view of the basic configuration of the system according to the present invention.

The embodiments of the present invention will next be described with reference to the related figures.

According to the present invention, there is provided a system for managing software development in a distributed development environment which integrates a plurality of resources prepared at a plurality of distributed bases into a final software system.

According to a first embodiment, it prepares the integrated software system by personal layers (P) consisting of logical hierarchies for performing work for development and management of individual resources on an individual level; group layers (G) consisting of logical hierarchies for performing work for development and management of subsystem resources by groups receiving the individual resources developed at the personal layers (P); and a master layer (M) consisting of a logical hierarchy for performing work for development and management of integrated project system resources by a project receiving the subsystem resources developed at the group layers (G).

According to this, a physically distributed development environment is formed by three logical hierarchies of the personal layers (P), group layers (G), and master layer (M) without regard as to the actual location of the bases. This enables the entire development environment to be viewed on a hierarchical scale.

According to a second embodiment, "logical work domains" are set for generating software modules in specific development environments for each of the succession of development environments appearing in the process of development of the software system. These logical work domains are allocated to the corresponding personal layers (P), group layers (G), and master layer (M).

By allocating logical work domains for each of the software systems to be successively developed in the process of development of an overall software system, for example, the individual test use software systems and combined test use software systems, it is possible to view the personal layers, group layers, and master layer on a smaller scale in units of objectives of work.

According to a third embodiment, each logical work domain has an environment managing functional unit for performing the function of managing the locations of resources held by the logical work domain in accordance with the type of the resources and the function of managing whether or not users accessing the resources have the qualifications for being allowed access to the resources.

According to this, it is possible to reliably manage the locations of the resources in the logical work domains and to protect the security of the resources.

According to a fourth embodiment, each logical work domain has a resource managing functional unit for managing the content and attributes of the resources held by the logical work domain as resource managing information and a system generation support functional unit for automatically extracting components of software based on the resource managing information and automatically generating system generation script while checking the appropriateness of the same and the allocation logic.

By having the resource managing functional unit manage the attributes of each of the resources, it becomes possible to automatically extract the resources required for generation of the target software system for development and to check the appropriateness of the resources and the allocation logic (whether stored in a predetermined memory area of a segmented memory).

According to a fifth embodiment, the logical work domain has a transfer resource extracting functional unit for automatically extracting resources for which transfer has been requested from one logical work domain by another logical work domain, a transfer managing functional unit for automatically transferring resources between one logical work domain and another logical work domain, and a transfer resource incorporating functional unit for automatically incorporating into the other logical work domain resources which have been transferred from that one logical work domain, said transfer resource extracting functional unit and said transfer resource incorporating functional unit transferring just the difference with a previous resource in the second and later transfers of the resource.

According to this, it becomes possible to extract the resources at a certain logical work domain, transfer the extracted resources to another logical work domain, and incorporate the resources in the logical work domain transferred to. Further, by transferring the difference from the previous transfer, it becomes possible to reduce the load on the WAN/LAN.

According to a sixth embodiment, the master layer (M) has a distribution managing functional unit for performing the function of taking out from the resources managed by the master layer (M) the software systems required by the logical work domains of the group layers (G) and distributing the same and the function of managing the state of distribution of the same when starting work for development of a software system.

According to this, it becomes possible to efficiently distribute the necessary resources without omission to each logical work domain.

According to a seventh embodiment, the master layer (M) has a collection managing functional unit for collecting and managing at the logical work domains in the master layer (M) the developed resources from the group layers (G) at the point of time when the development of the resources distributed from the master layer (M) to a plurality of group layers (G) is completed and an integrated checking functional unit for performing the function of integrating the developed resources obtained through the collection managing functional unit and the function of checking the consistency of the resources developed in duplicate by the plurality of group layers (G).

According to this, it becomes possible to integrate the resources distributed at the group layers at a logical work domain at the master layer. Further, by checking for duplication of distribution, it becomes possible to eliminate lack of consistency at the time of integration.

According to an eighth embodiment, each logical work domain has an external definition/reference information extracting functional unit for extracting the external definition information and external reference information of the resources at the time of developing the resources and an external reference relationship extracting functional unit for performing the function of sifting through the reference relationships of the resources based on the extracted external definition information and external reference information.

According to this, it becomes possible to easily determine the existence of other resources influenced by a resource which has been modified when resources distributed to the group layers are again collected at the master layer after development work.

According to a ninth embodiment, the logical work domain has a modified resource extracting functional unit for extracting resources in which modifications have occurred along with the development of the resources and newly added resources and a modified resource influence evaluating functional unit for generating influenced resource information indicating resources which have to be redeveloped due to reference to the resources in which modifications have occurred.

This enables just the resources which have to be modified to be redone.

FIG. 1 is a view of the basic configuration of the system according to the present invention. The configuration in the figure corresponds to the first embodiment explained above.

The present invention, as illustrated, provides a system which realizes a distributed development environment consisting of a combination of logical hierarchies comprised of personal layers (P), group layers (G), and a master layer (M).

A personal layer consists of the individual work environment where individual developers engage in the design and fabrication of software they are in charge of. A group layer consists of a work environment where a software system is prepared by a group. The master layer consists of the work environment for integrating the software systems prepared at the group layers and a "warehouse" environment for centrally managing the integrated resources.

Note that this system can be used for any size of a project and for any physical distribution of work.

Figure 2:
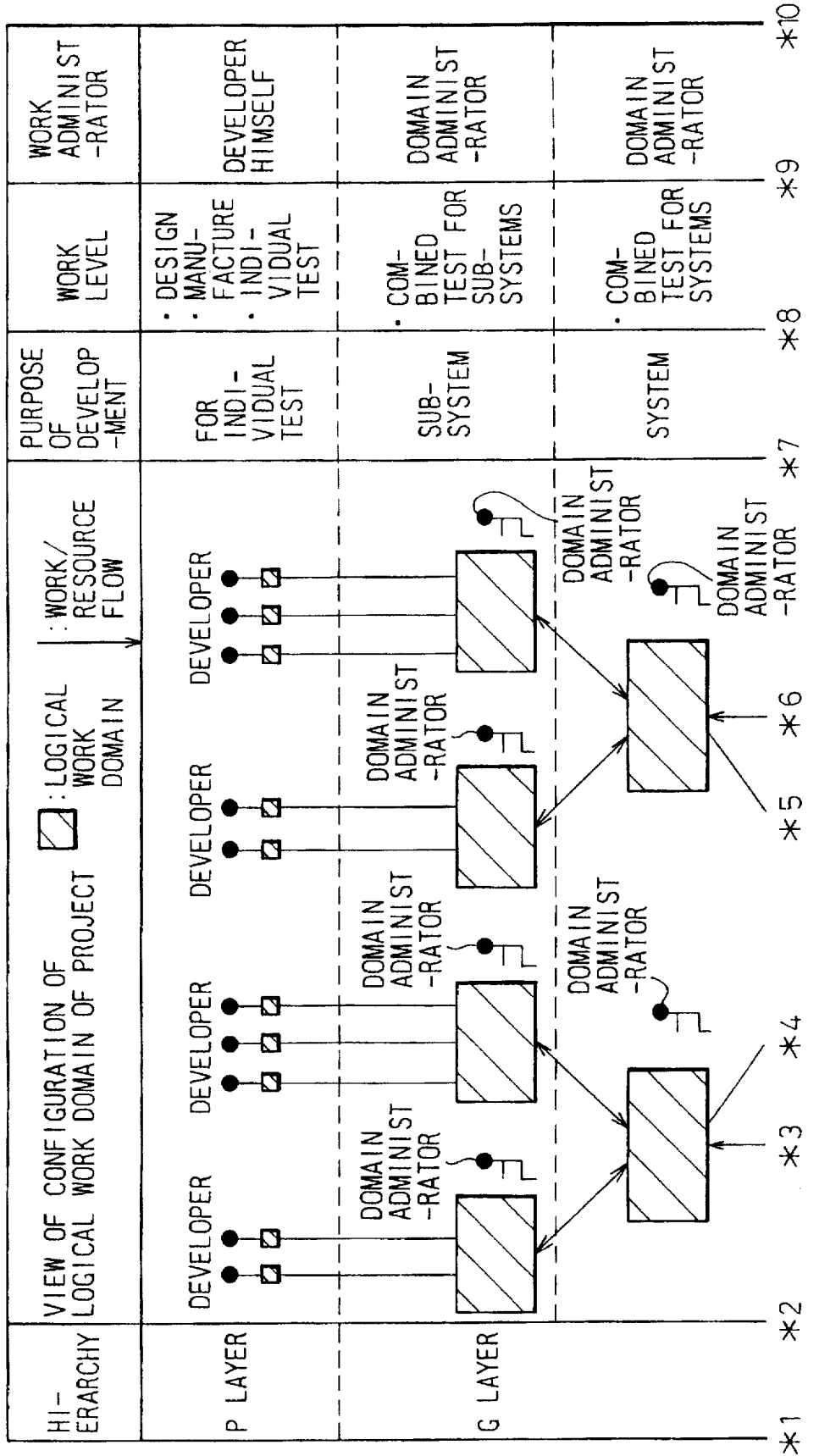
FIG. 2 is a more detailed view (part 1) of the content of FIG. 1.
Figure 3:
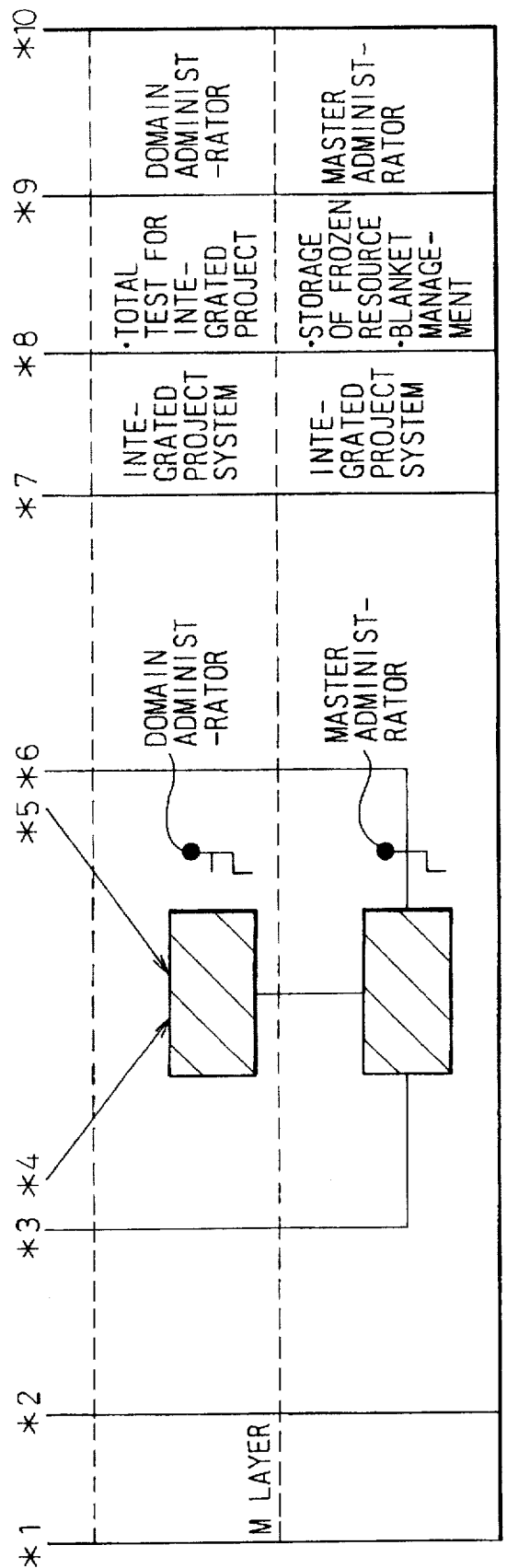
FIG. 3 is a more detailed view (part 2) of the content of FIG. 1.

FIG. 2 and FIG. 3 provide more detailed views of the content of FIG. 1. These show the second embodiment.

As shown in FIG. 2 and FIG. 3, the distributed work environment realized based on FIG. 1 is realized by a combination of logical work domains which are defined as units of environments for preparing a succession of software systems to be developed in accordance with an overall development process.

In the project shown in FIG. 2, the succession of software systems to be developed along with the progress in the overall development process are changed such that the individual test software→the combined subsystem test software→the combined system test software→the combined integrated project test software. The hatching in FIG. 2 show the logical work domains, which are allocated as follows: The logical work domains for the individual tests are set in the personal layers, the logical work domains for the combined subsystem tests and the logical work domains for the combined system tests are set in the group layer, and the logical work domains for the combined project tests and the portions for storing the frozen resources are set at the master layer. Each logical work domain is assigned a domain administrator who is given the job of promoting the development work in the logical work domain and cooperation with other domains. Note that in the individual level logical work domains located at the personal layer, each individual acts as a domain administrator.

By realizing such a development environment by hierarchies set in accordance with the levels of work and logical work domains for each software system to be developed, it is possible to manage the environments in the logical work domains and control the flow of the resources between logical work domains while viewing the overall development environment. Accordingly, it is possible to flexibly deal with expansions of projects or increases in facilities along with movement of some operations to the suburbs etc. without regard to the actual physical distribution of the development system.

Figure 4:
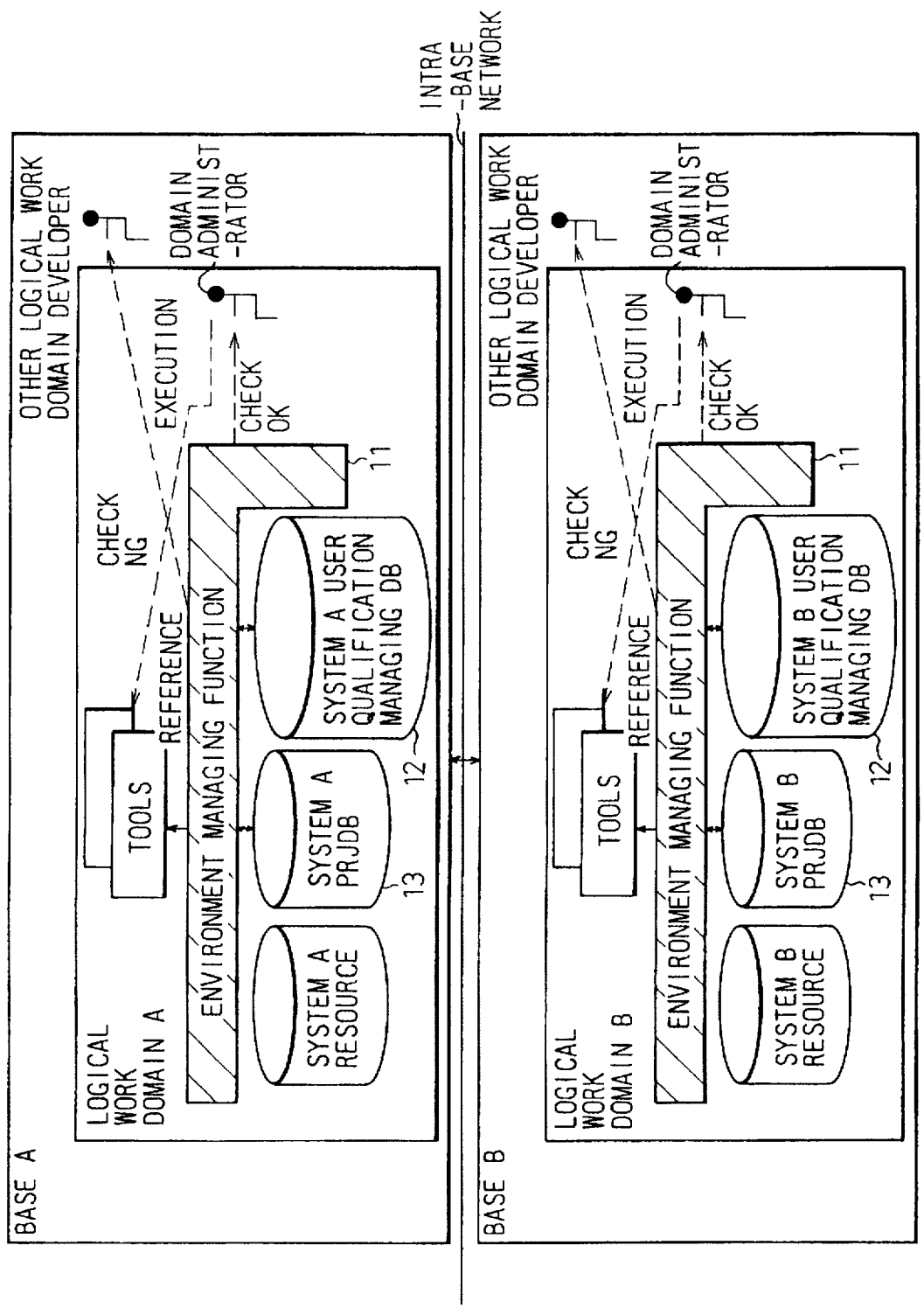
FIG. 4 is a view of the environment managing functional unit according to the present invention.

FIG. 4 is a view of the environment managing functional unit according to the present invention. This shows the third embodiment of the invention.

The distributed development environment realized by the configuration of FIG. 1 to FIG. 3 provides an environment managing functional unit 11 in each logical work domain. The functional unit 11 manages the location of the resources held and protects the security of the resources.

This functional unit 11 manages the locations of the resources held at the logical work domain by a project data base (PRJDB) for each of the types of the resources (source module (SM), object module (OM), load module (LM), etc.) and manages the users allowed access to the logical work domain, their qualifications, and the types of the resources which can be accessed so as to enable the security of the resources to be protected for each type of resource. Further, it sets the project data base PRJDB as input/output information of the tools which are activated in each logical work domain so as to enable automatic control of the input/output locations of the resources.

Figure 5:
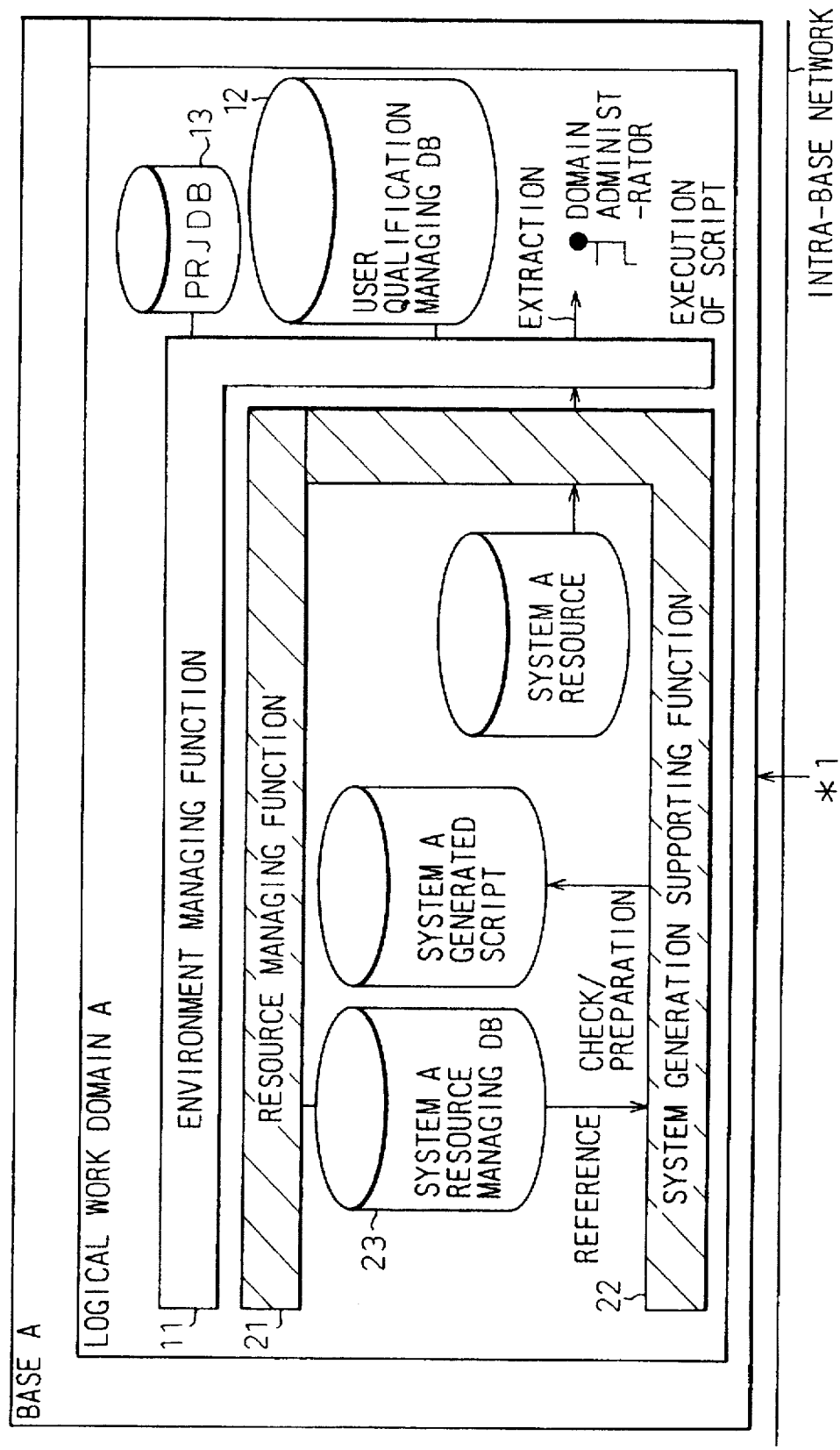
FIG. 5 is a view (part 1) of the resource managing functional unit and system generation support functional unit according to the present invention.
Figure 6:
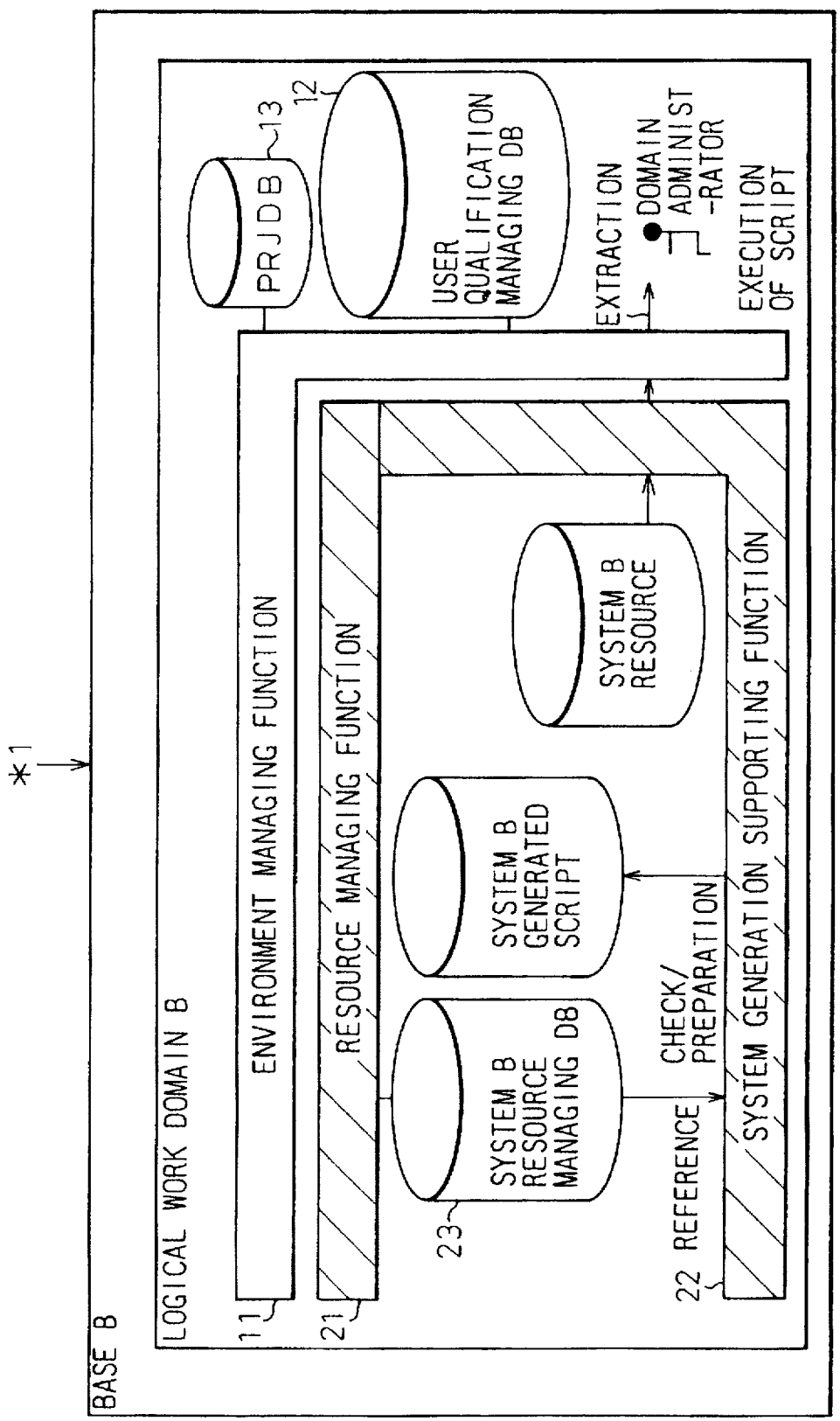
FIG. 6 is a view (part 2) of the resource managing functional unit and system generation support functional unit according to the present invention.

FIG. 5 and FIG. 6 are views of the resource managing functional unit and system generation support functional unit according to the present invention. These show the fourth embodiment.

The distributed development environment realized by the configuration of FIG. 1 to FIG. 3 is provided with a resource managing functional unit 21 and system generation support functional unit 22. These functional units 21 and 22 support the generation of the software system.

The resource managing functional unit 21 manages the content of the resources held at the logical work domain, the version numbers, the history, the system attributes, and other information of the components of the software system by the resource managing data base (DB) 23. This functional unit enables managing of the locations of resources and protection of security by combination with the environment managing functional unit 11 of FIG. 4. Further, the system generation support functional unit 22 automatically extracts the components of the software system to be developed at the logical work domain based on the resource managing information, checks, as software components, their appropriateness the combinations, and the logical allocations, then automatically generates script for generating the software system to thereby support the smooth production of a software system of a high quality.

Figure 7:
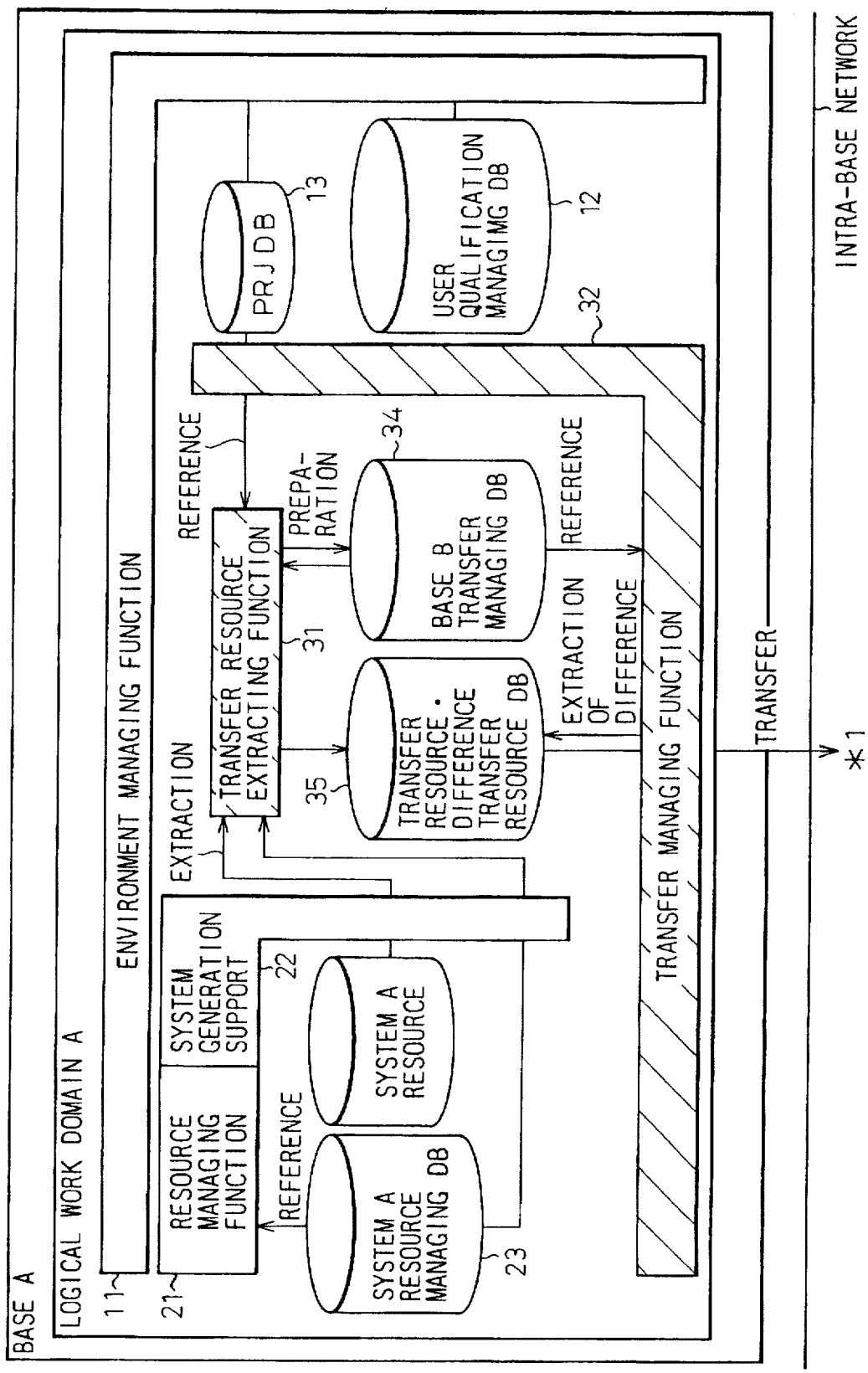
FIG. 7 is a view (part 1) of the transfer resource extracting functional unit and transfer managing functional unit according to the present invention.
Figure 8:
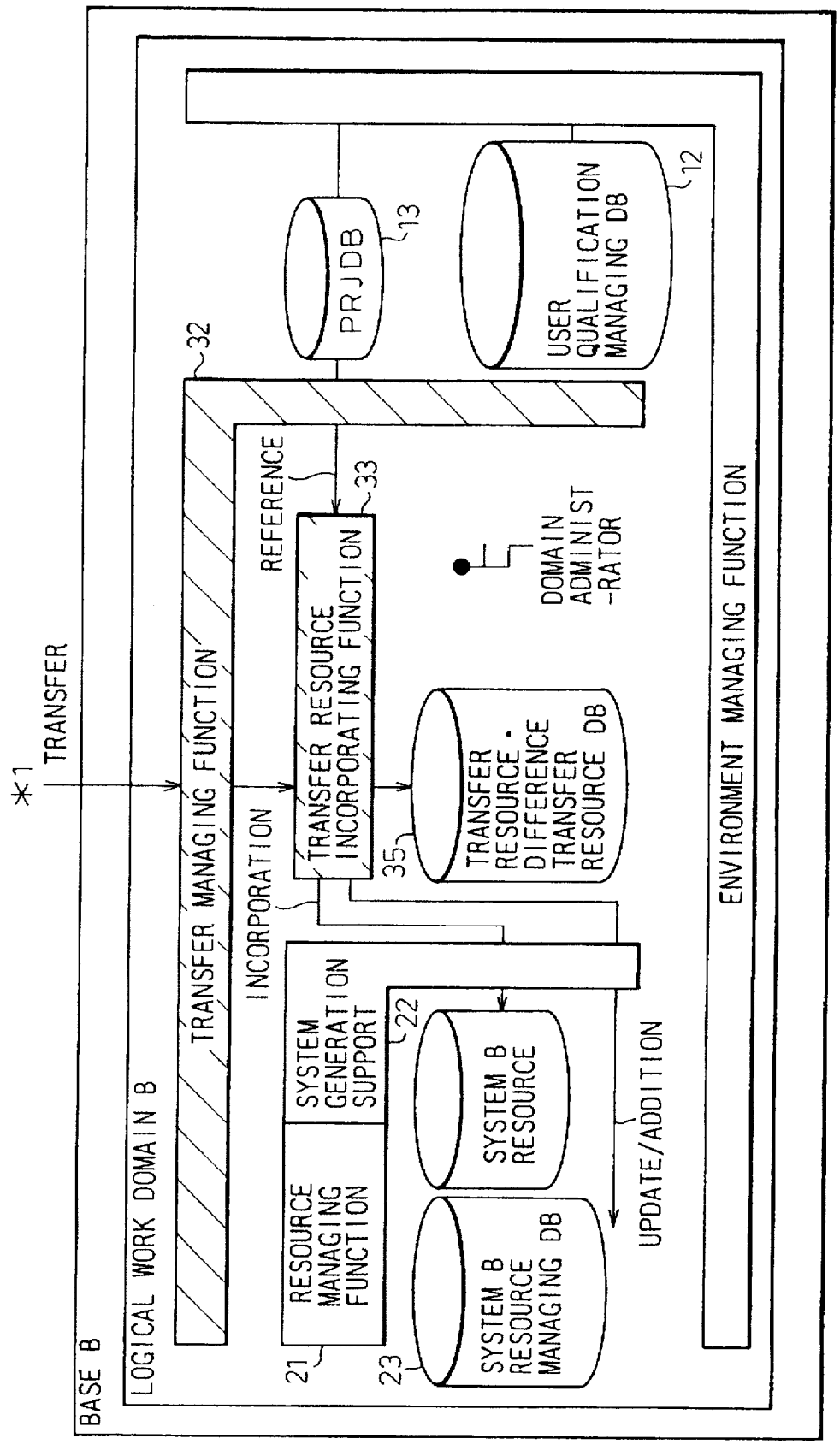
FIG. 8 is a view (part 2) of the transfer extracting functional unit and transfer managing functional unit according to the present invention.

FIG. 7 and FIG. 8 are views of the transfer resource extracting functional unit and transfer managing functional unit according to the present invention. These show the above-mentioned fifth embodiment.

The distributed development environment realized by the configuration of FIG. 1 to FIG. 3 is provided with a transfer resource extracting functional unit 31 for extracting resources held from one logical work domain to another logical work domain, a transfer managing functional unit 32 for transferring resources to a designated logical work domain without regard to the physical distribution, and a transfer resource incorporating functional unit 33 for incorporating the resources at the domain transferred to.

In this case, the transfer of resources from one logical work domain to another logical work domain requires first that the domain administrator of the logical work domain originating the request for the transfer be registered as qualified at the user qualification managing data base 12 in the environment managing functional unit 11 of FIG. 4. The domain administrator originating the request for transfer activates the transfer resource extraction functional unit 31 of the logical work domain to which the transfer request is sent. The transfer resource extraction functional unit 31 is able to select any of the resources or to select component resources of any software system to be developed by referring to the project data base PRJDB 13 of the environment managing unit 11 of FIG. 4 or the resource managing data base 23 of the resource managing functional unit 21 of FIG. 4 and FIG. 5, prompting the automatic extraction of these resources at the system generation support functional unit 22 of FIG. 5 and FIG. 6, and preparing the resources for transfer. The transfer managing functional unit 32 transfers the prepared resources to the designated engineering work stations (EWS) without regard as to the physical distribution and simultaneously prepares a transfer managing data base 34 for managing the state of transfer for every engineering work station to which resources were transferred. In the case of a second or later transfer, it is possible to refer to the transfer managing data base 34, search for changes in version among the resources to be transferred, and to extract and transfer only the difference between the versions. On the other hand, when the transfer resource incorporating functional unit 33 of the logical work domain originating the request for transfer is activated after the resources have been transferred to the originator of the transfer request, the transfer resource incorporating functional unit 33 incorporates the transferred resources into the resources held by the logical work domain originating the transfer request and, simultaneously, modifies or adds information to the resource managing data base 23 of the resource managing functional unit 21 of FIG. 5 and FIG. 6 to update the state of possession of resources.

Figure 9:
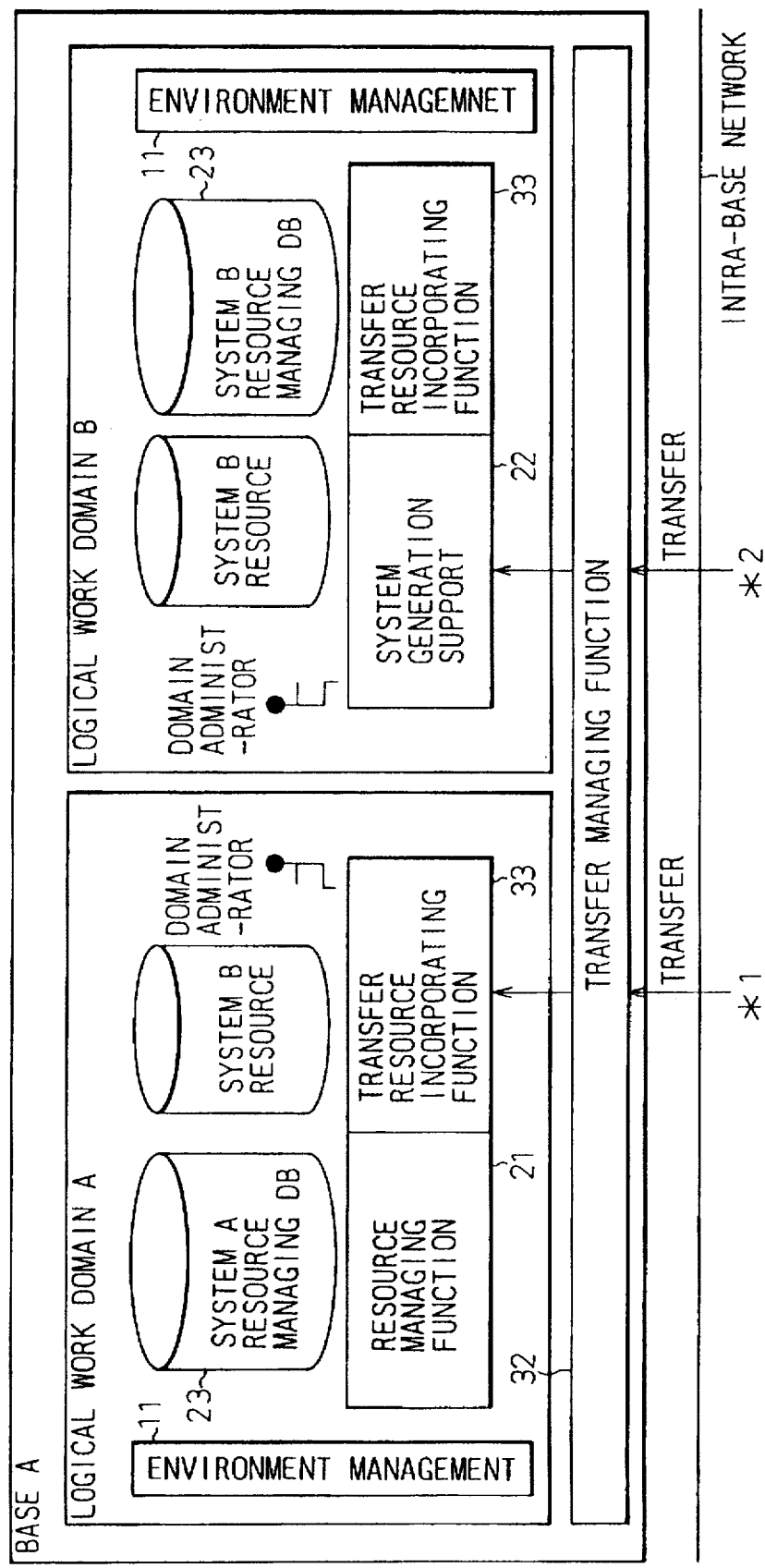
FIG. 9 is a view (part 1) of the distribution managing functional unit according to the present invention.
Figure 10:
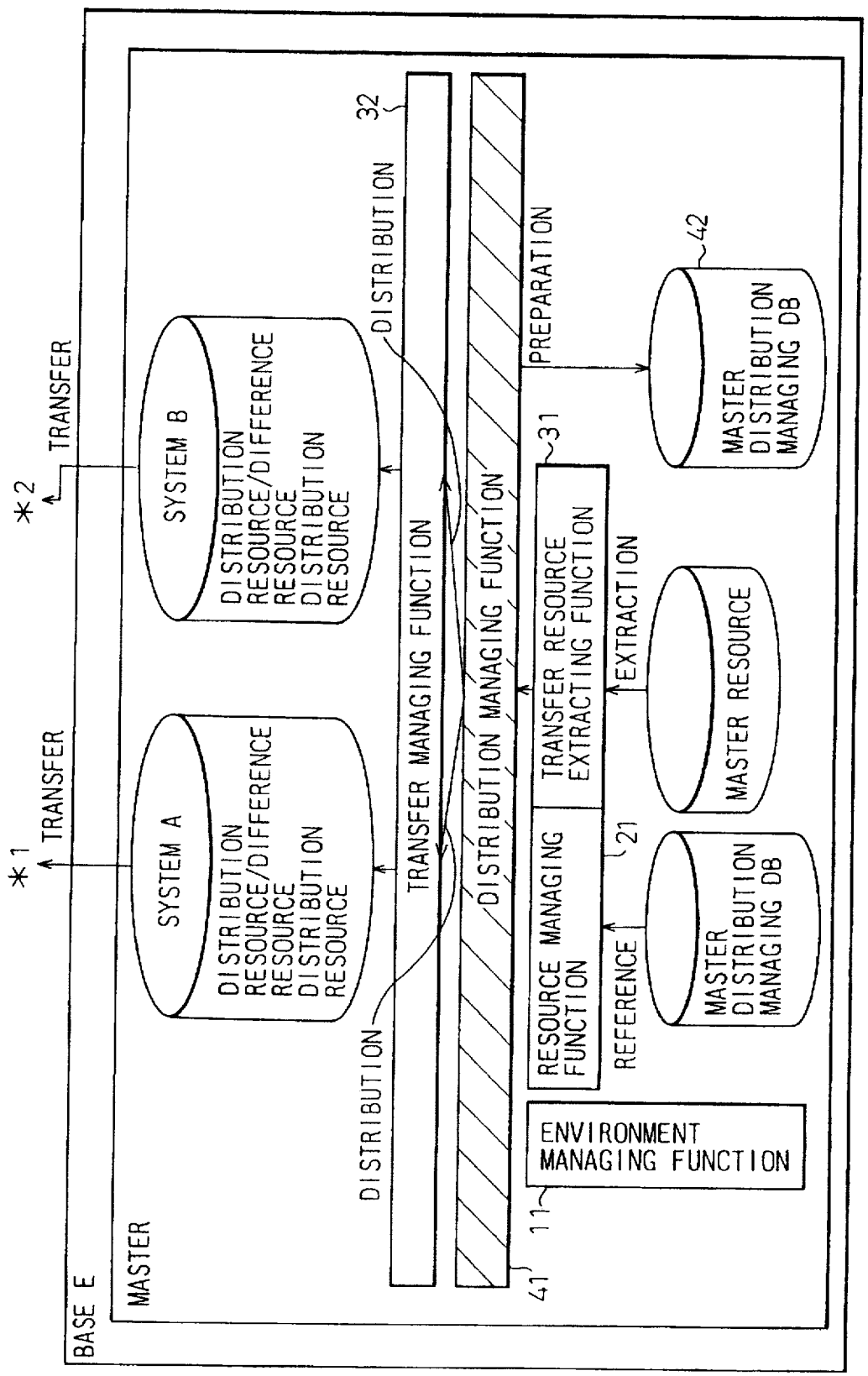
FIG. 10 is a view (part 2) of the distribution managing functional unit according to the present invention.

FIG. 9 and FIG. 10 are views of the distribution managing functional unit according to the present invention. These show the sixth embodiment of the present invention explained above.

The distributed development environment realized by the configuration of FIG. 1 to FIG. 3 takes out the component resources of the software system to be developed at the group unit logical work domains of the group layers (G) from the logical work domain of the master of the project unit software system at the master layer (M) and distributes the same without omission.

Here, in distributing resources to the logical work domains of the group layers, it is assumed that the domain administrators of the logical work domains of the group layers have their qualifications registered at the user qualification managing data bases 12 of the environment managing functional units 11 shown in FIG. 4 of the master layer. The domain administrator of the logical work domain of the group layer activates the distribution managing functional unit 41 of the master layer. The distribution managing functional unit 41 refers to the project data base PRJDB 13 of the environment managing functional unit 11 shown in FIG. 4 at the master layer and the resource managing data base 23 of the resource managing functional unit 21 shown in FIG. 5 and FIG. 6 to select the necessary resources, prompts the system generation support functional unit 22 shown in FIG. 6 to automatically extract the resources, prepares the distribution resources, and at the same time prepares the distribution managing data base 42 for managing the state of distribution of the resources. After this, the transfer managing functional unit 32 shown in FIG. 7 and FIG. 8 transfers the resources to the destination logical work domain and incorporates the same in the logical work domain. Further, the transfer managing functional unit 32 is able to distribute just the differences from the past transfer.

Figure 11:
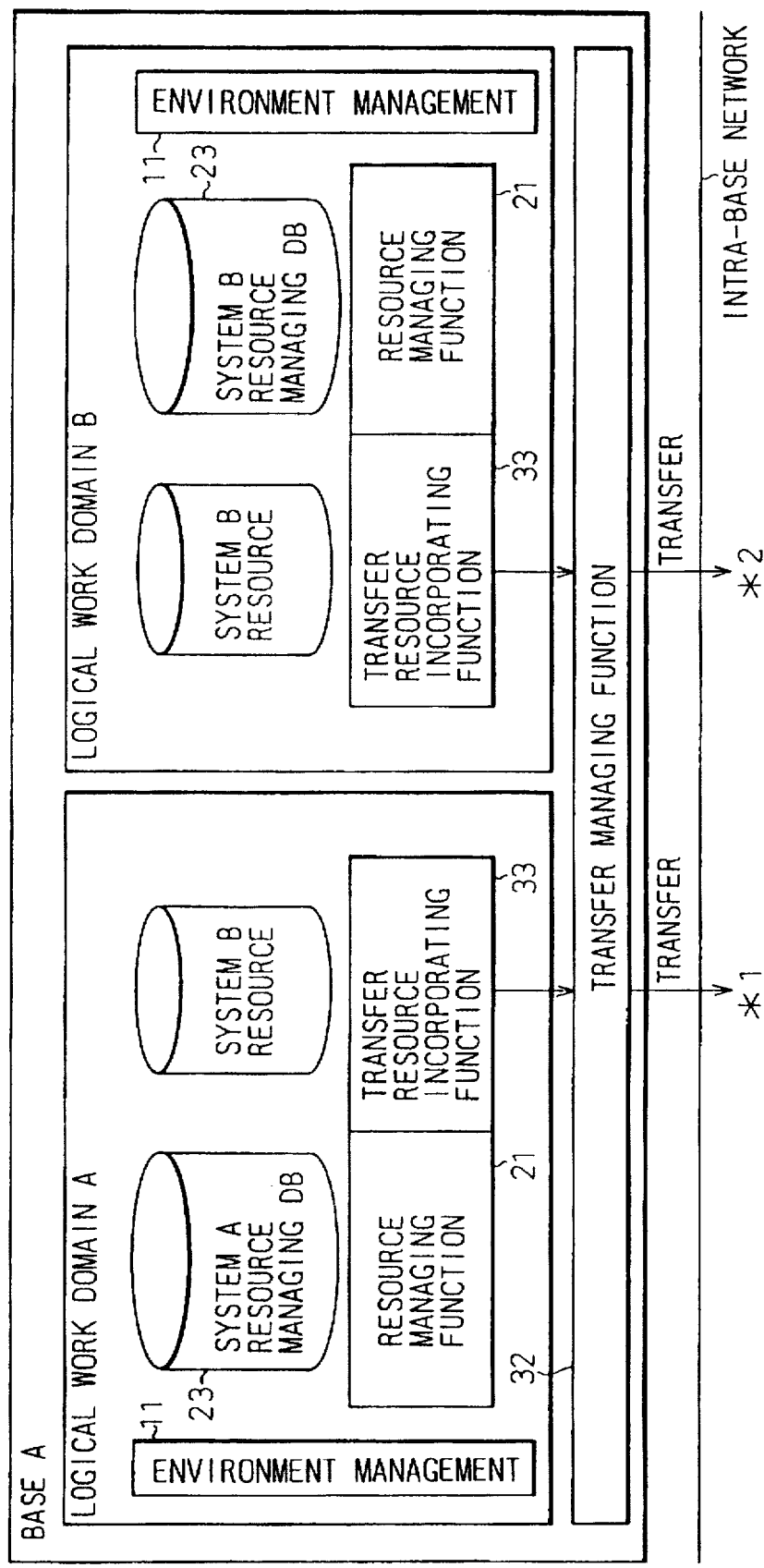
FIG. 11 is a view (part 1) of the collection managing functional unit and the integrated check functional unit according to the present invention.
Figure 12:
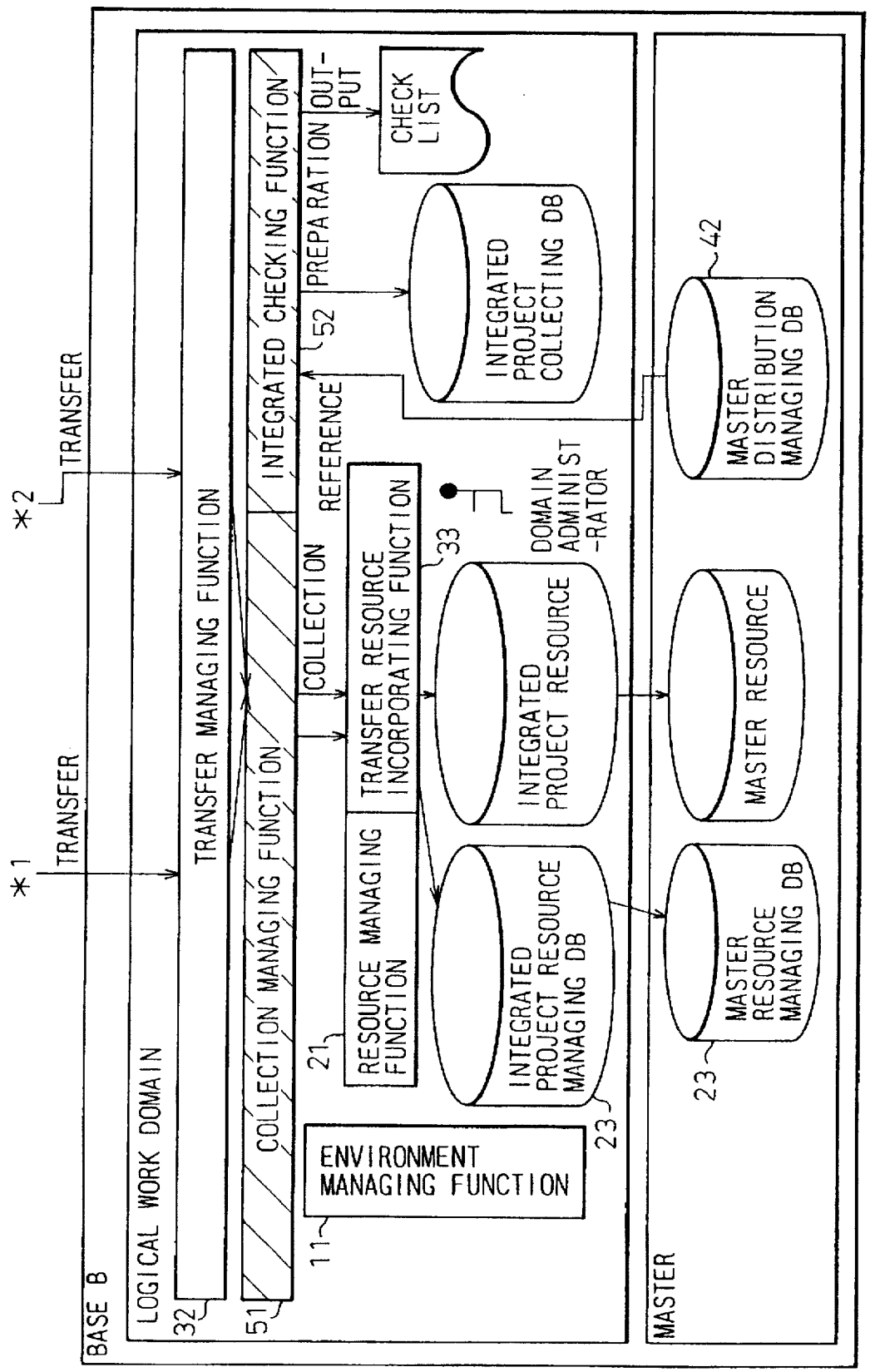
FIG. 12 is a view (part 2) of the collection managing functional unit and the integrated check functional unit according to the present invention.

FIG. 11 and FIG. 12 are views of the collection managing functional unit and the integrated checking functional unit according to the present invention. These show the seventh embodiment of the present invention explained above.

The distributed development environment realized by the configuration of FIG. 1 to FIG. 3 is provided with a function for integrating the resources into the software system to be developed at the project unit logical work domain of the master layer (M) at the point of time when the development of the resources distributed from the configuration of FIG. 10 is completed and a function for checking the integration of the duplicatedly developed resources and collects the resources.

In the operation for collecting resources at the project unit logical work domain at the master layer (M), first the domain administrator of the logical work domain of the master layer activates the collection managing functional unit 51. The collection managing functional unit 51 checks the resources to be collected based on the distribution managing data base 42 prepared when distributing the resources to the group layers (G), outputs a check list of certain resources liable to have be duplicated when integrated, collects the other resources from the logical work domains of the group layers (G) by the transfer managing functional unit 32 shown in FIG. 7 and FIG. 8, and incorporates the same in the logical work domain of the master layer (M).

When the software system of the integrated project finishes being developed, the resources are moved to and frozen at the logical work domain of the master layer (M).

Figure 13:
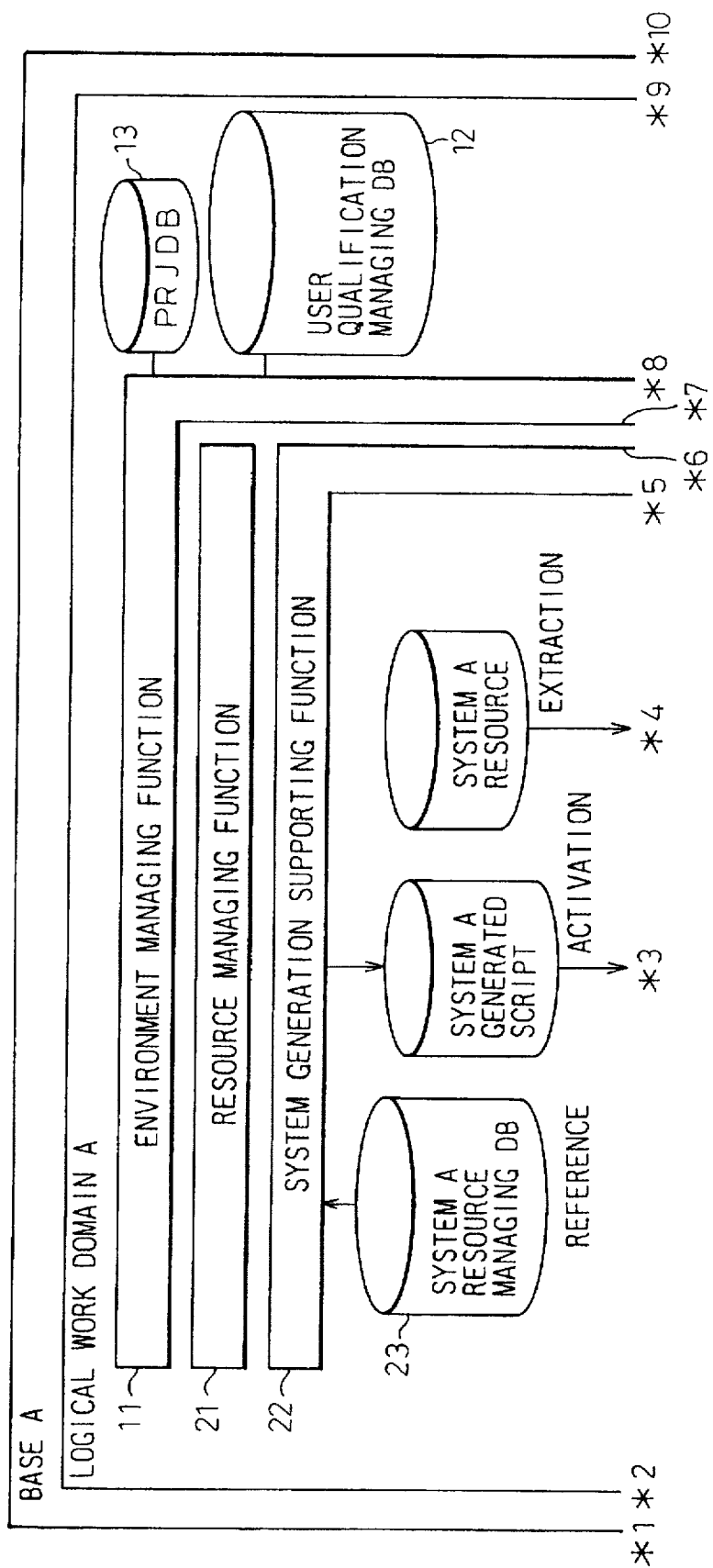
FIG. 13 is a view (part 1) of an external definition/reference information extraction functional unit and external reference relationship extraction functional unit according to the present invention.
Figure 14:
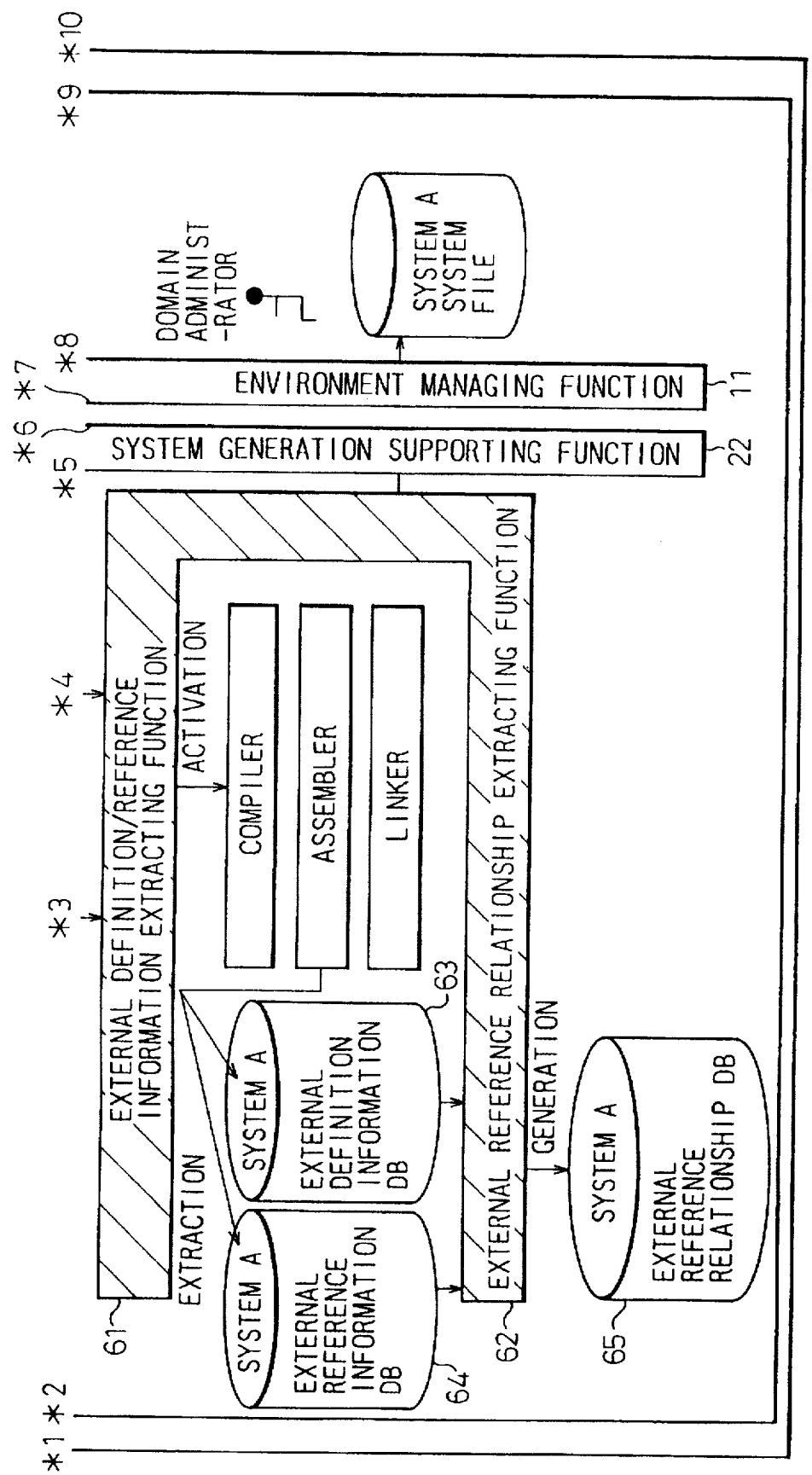
FIG. 14 is a view (part 2) of an external definition/reference information extraction functional unit and external reference relationship extraction functional unit according to the present invention.

FIG. 13 and FIG. 14 are views of an external definition/reference information extraction functional unit and external reference relationship extraction functional unit according to the present invention. These show the eighth embodiment of the present invention mentioned above.

The distributed development environment realized by the configuration of FIG. 1 to FIG. 3 is provided with a function for extracting the external definition information (external entry name, definition macro name, definition field/subfield name) and the external reference information (reference entry name, reference macro name, reference field/subfield name) of the resources at the time of assembly and sifting through the reference relationships of the resources constituting the software when generating software systems based on the configuration of FIG. 5 and FIG. 6.

The external definition information data base, the external reference information data base, and the external reference relationship data base are shown by reference numerals 63, 64, and 65, respectively.

Figure 15:
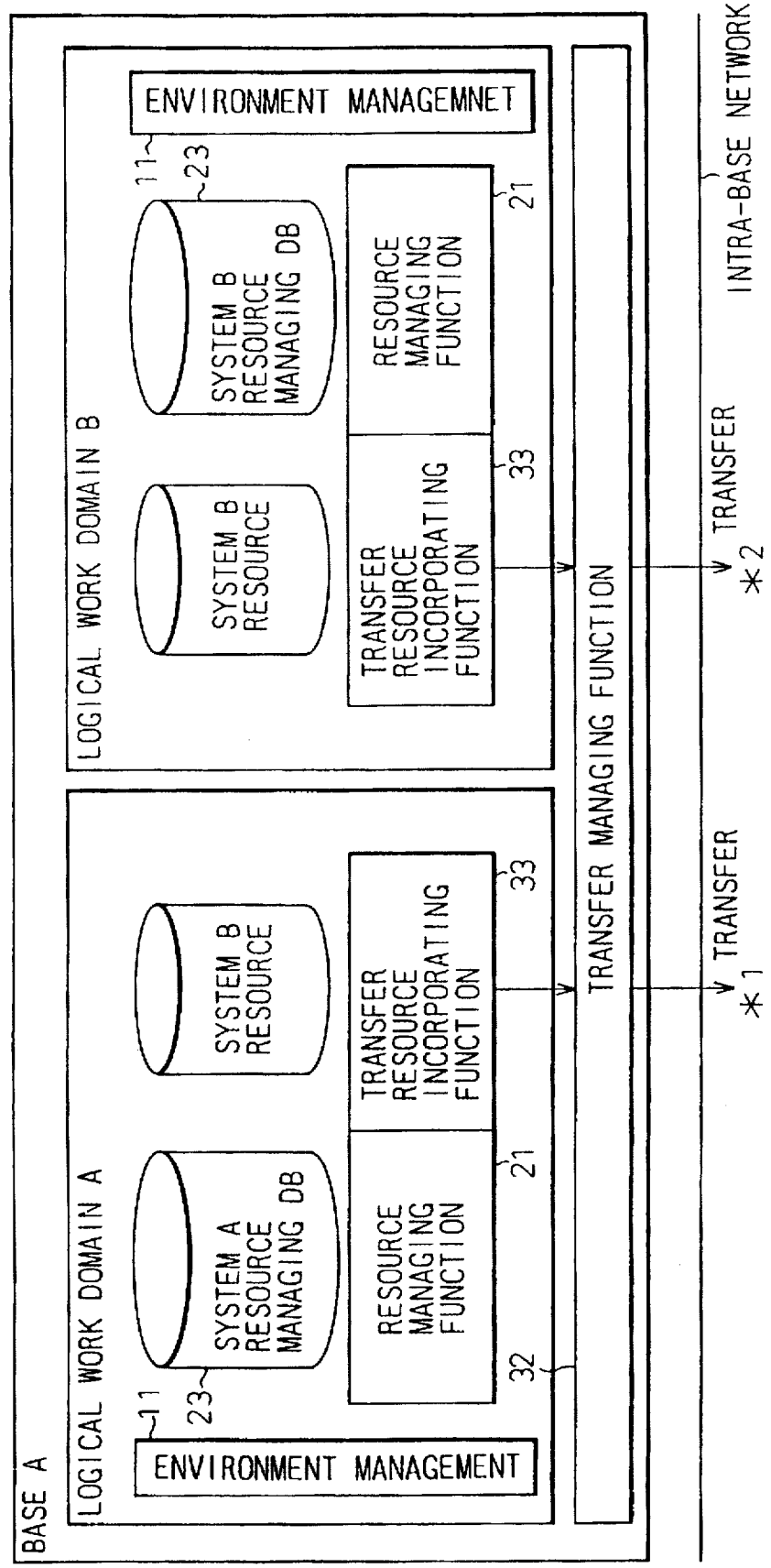
FIG. 15 is a view (part 1) of a modified resource extraction functional unit and a modified resource influence evaluating functional unit according to the present invention.
Figure 16:
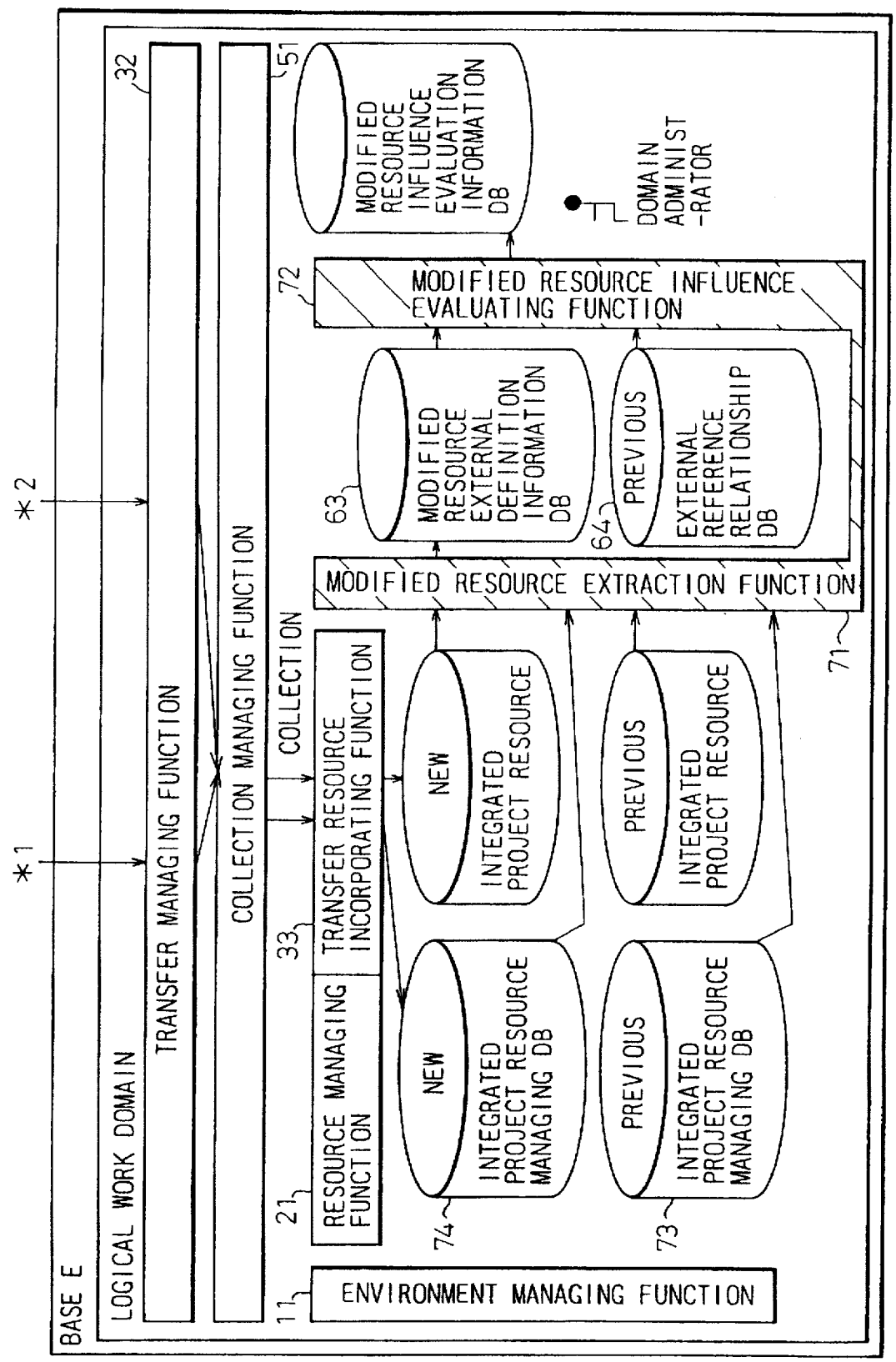
FIG. 16 is a view (part 2) of a modified resource extraction functional unit and a modified resource influence evaluating functional unit according to the present invention.

FIG. 15 and FIG. 16 are views of a modified resource extraction data base functional unit and a modified resource influence evaluating functional unit according to the present invention.

The distributed development environment realized by the configuration of FIG. 1 to FIG. 3 is provided with a function for extracting from among the resources distributed as in FIG. 9 and FIG. 10 and then collected as in FIG. 11 and FIG. 12 those resources which have been modified in comparison with the component resources of the software system before distribution and the resources which require redoing due to having referred to the same so as to evaluate the influence of the modified resources.

The modified resource extraction functional unit 71 compares the resource managing data base 73 of the software system before distribution of resources and the current resource managing data base 74 and extracts the modified resources and the newly added resources. Further, the modified resource influence evaluating functional unit 72 extracts the external definition information of the modified resources (external entry name, definition macro name, definition field/subfield name), compares it with the external reference information extracted at the time of generation of the software system before distribution, and thereby picks out the resources which refer to the modified resources.

Figure 17:
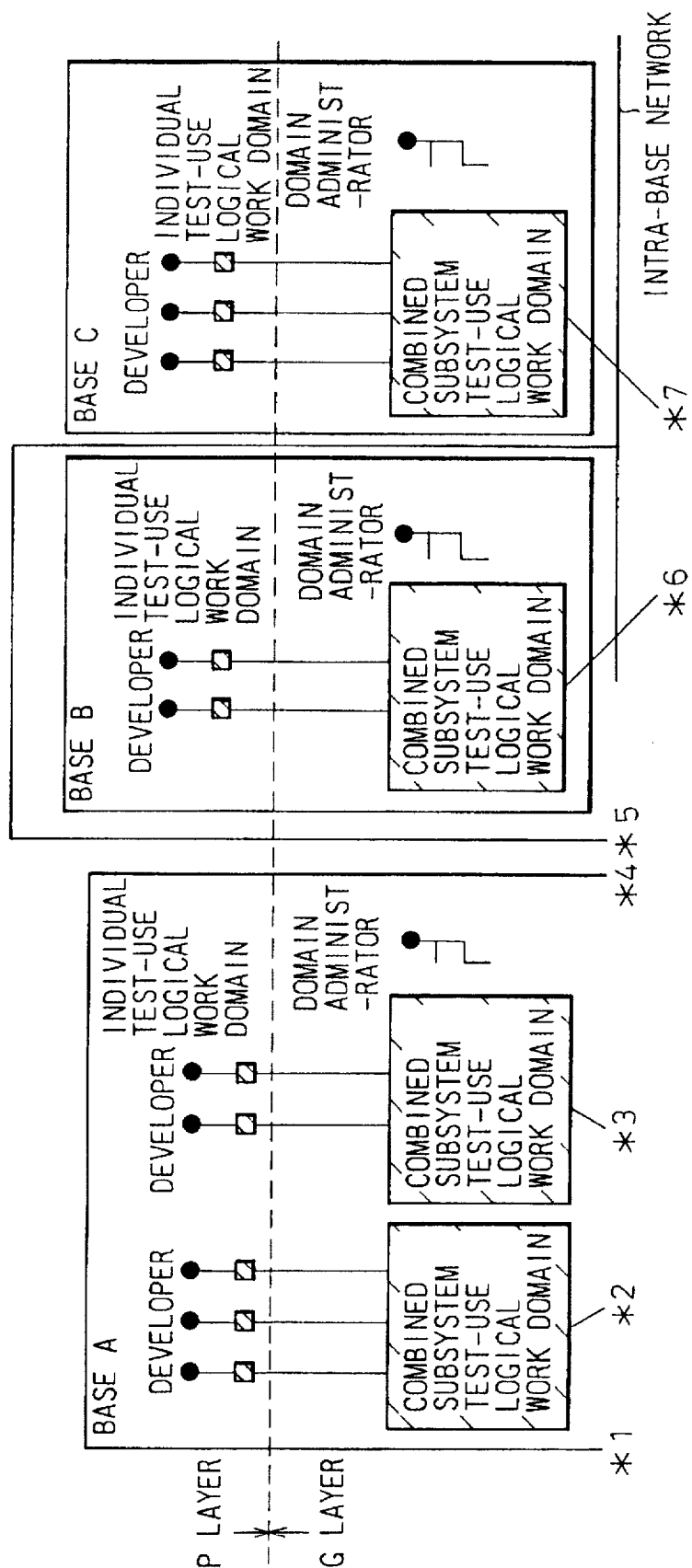
FIG. 17 is a view (part 1) of a detailed example of the configuration of FIG. 2 and FIG. 3.
Figure 18:
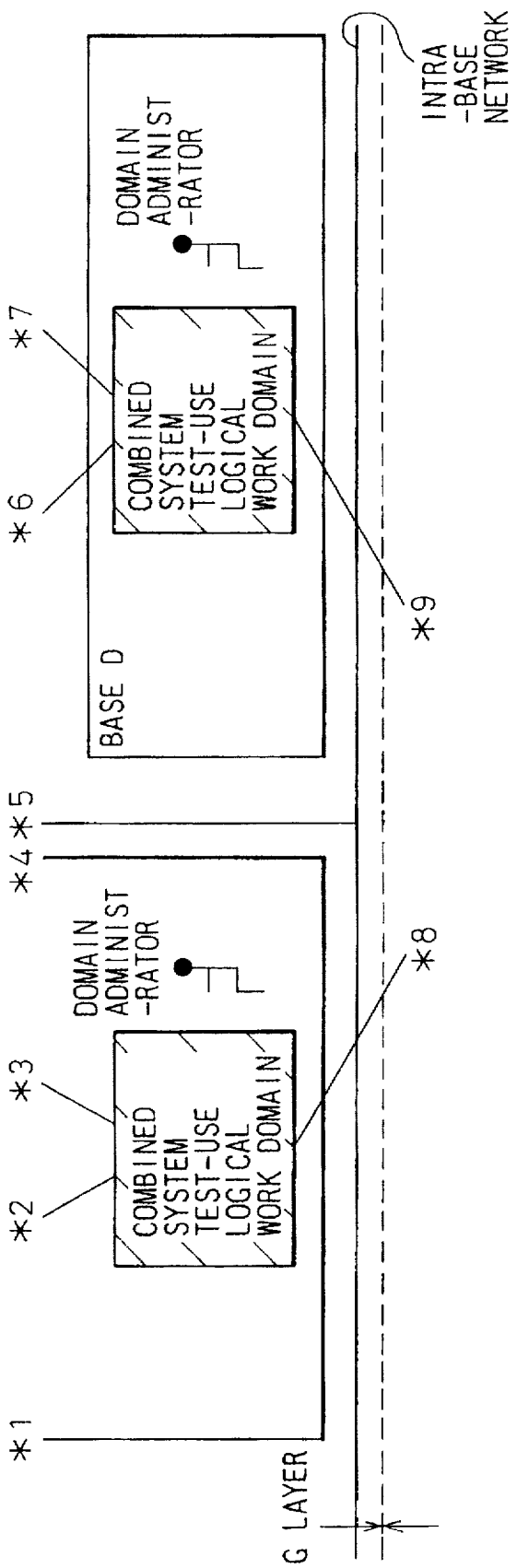
FIG. 18 is a view (part 2) of a detailed example of the configuration of FIG. 2 and FIG. 3.
Figure 19:
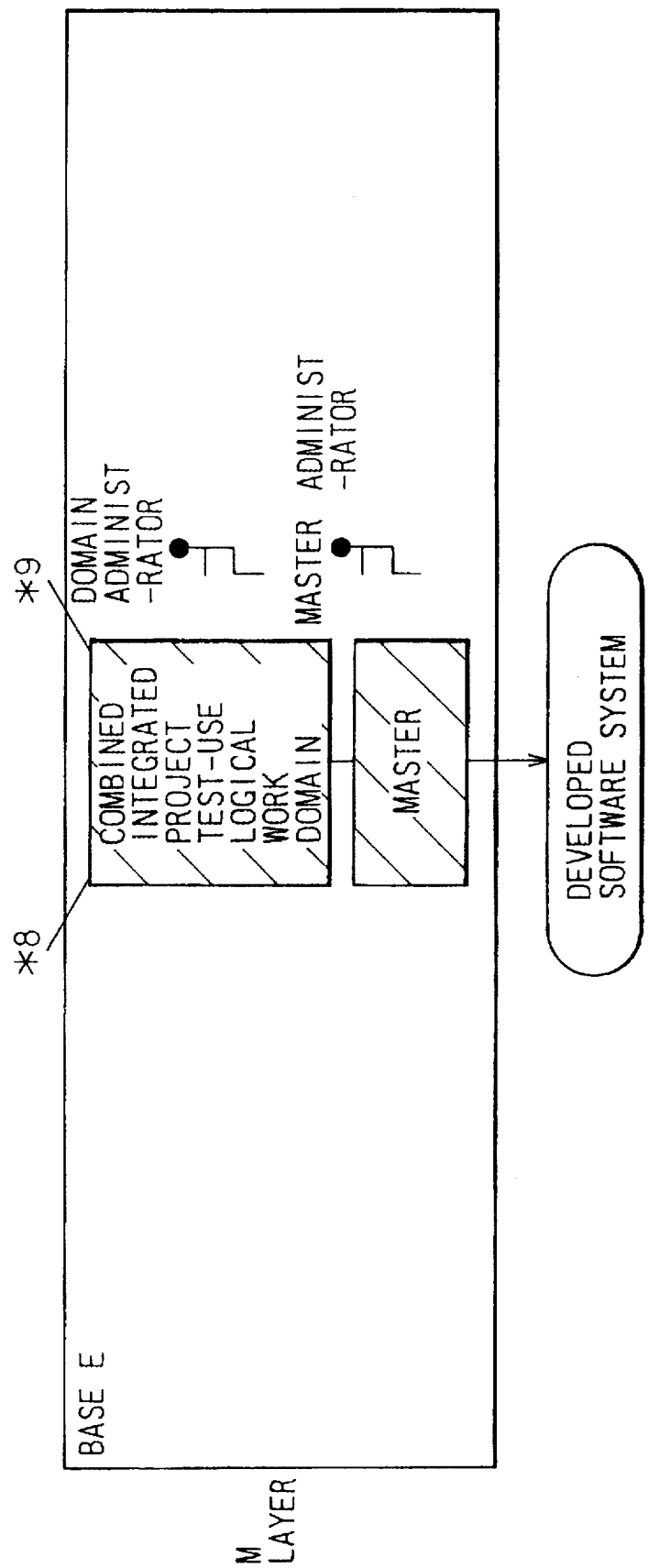
FIG. 19 is a view (part 3) of a detailed example of the configuration of FIG. 2 and FIG. 3.

FIG. 17, FIG. 18, and FIG. 19 are views of a detailed example of the configuration of FIG. 2 and FIG. 3.

In the project shown in FIG. 17 to FIG. 19, there are the physically distributed bases A to E. The software system to be developed is divided into for example software for individual tests, combined subsystem tests, combined system tests, and combined integrated project tests. That is, several developers' worth of individual test logical work domains are set in the personal layers (P), the combined subsystem test logical work domains and combined system test logical work domains are set in the same number of group layers (G) as the number of types, and one combined integrated project test logical work domain and one frozen resource storing master are set in the master layer (M) to construct the development environment as a whole.

As the above-mentioned project, mention was made for example of the construction of a software system for a large-scale electronic exchange, but there are also software systems used for other large-sized telecommunication systems. Further, the above tests are tests for the prepared software modules themselves.

Figure 20:
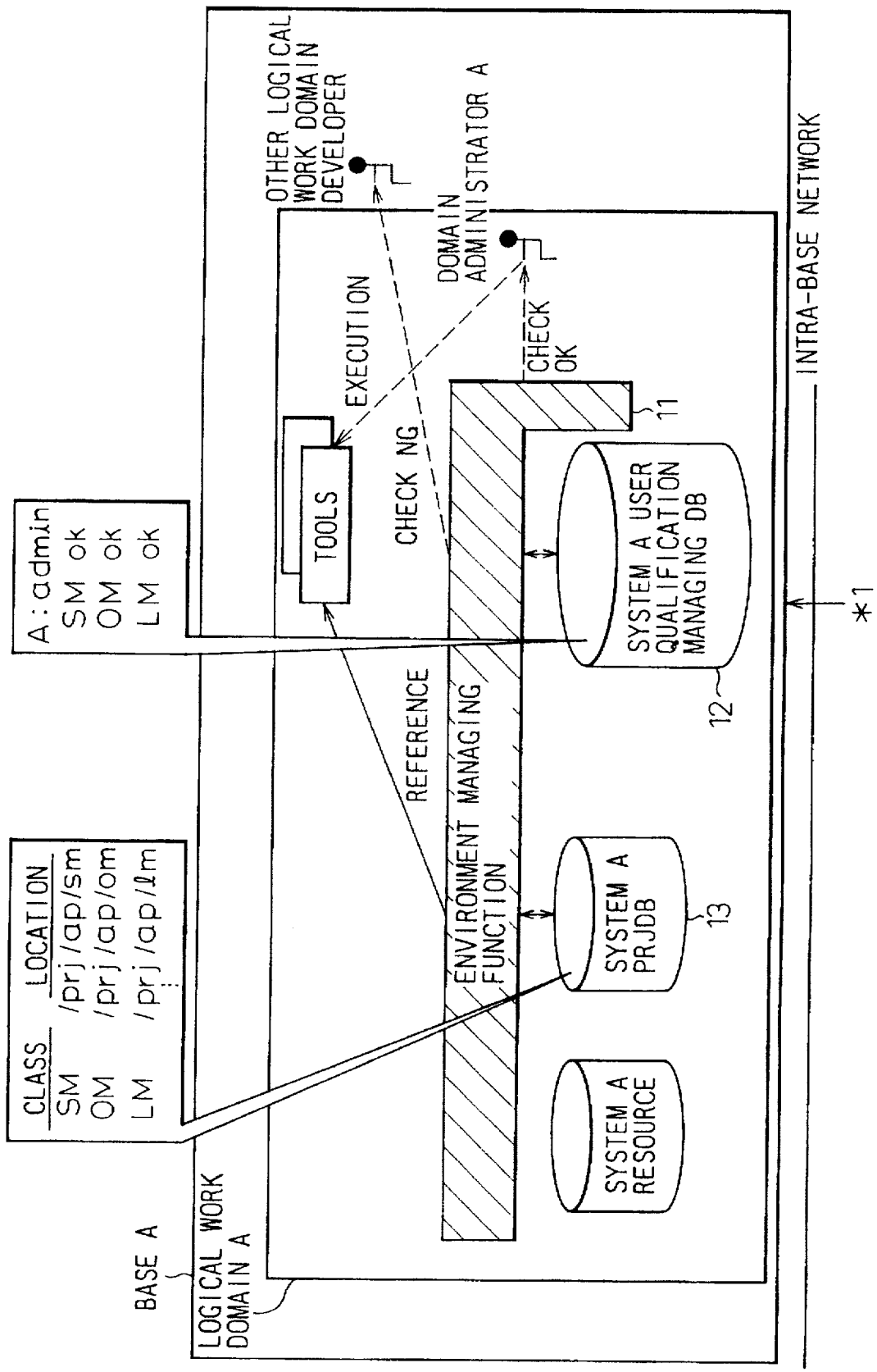
FIG. 20 is a view (part 1) of a detailed example of the configuration of FIG. 4.
Figure 21:
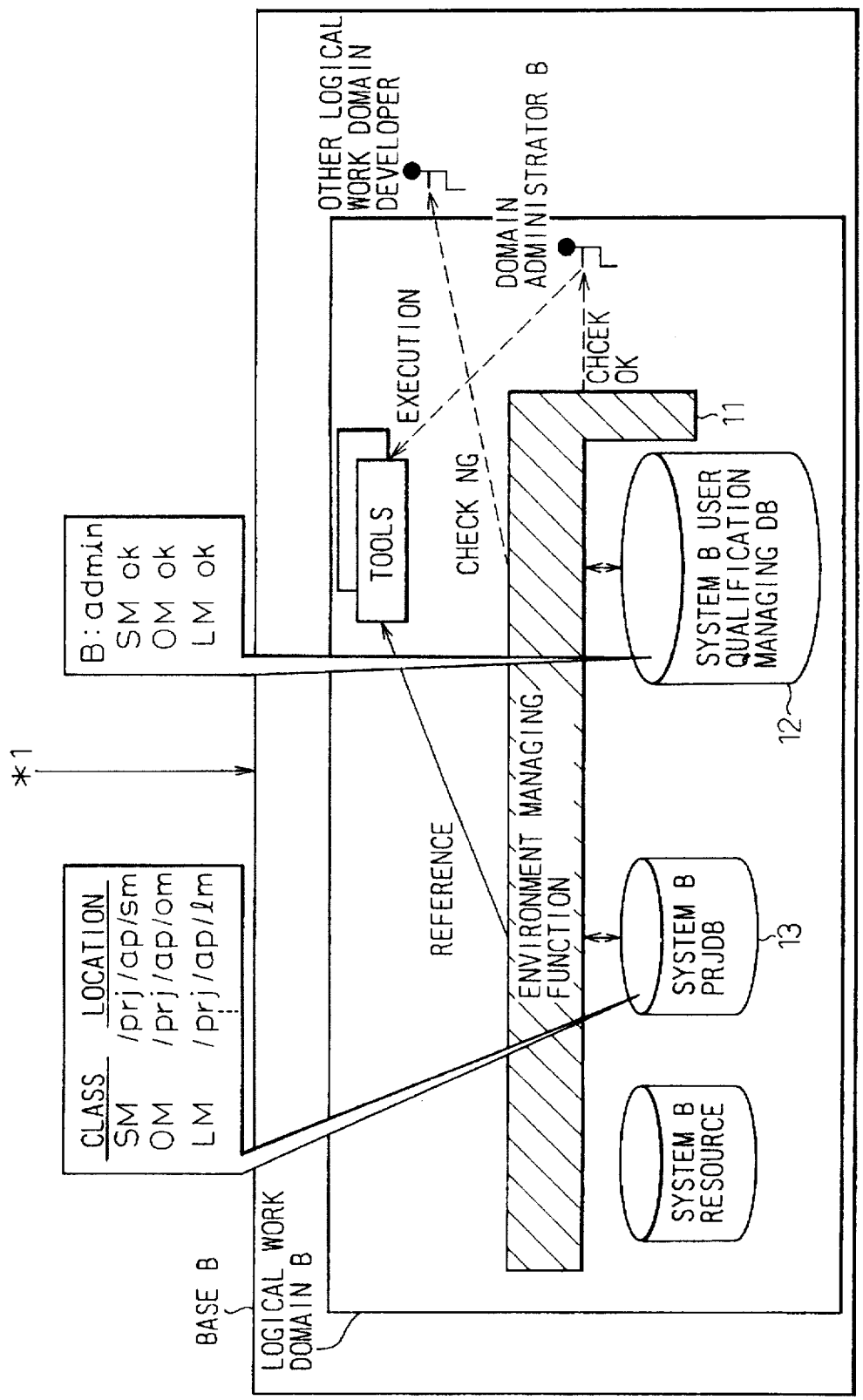
FIG. 21 is a view (part 2) of a detailed example of the configuration of FIG. 4.

FIG. 20 and FIG. 21 are views of a detailed example of the configuration of FIG. 4.

Assume for example that the logical work domain of the base A is for development of the system A and the logical work domain of the base B is for development of the system B. Each of the logical work domains A and B is provided with an environment managing functional unit 11. The logical work domains A and B manage location directories for each type of resource, for example, the source module (SM), object module (OM), and load module (LM) explained above, at the project data bases PRJDB, manage the qualifications of users allowed to access the resources of the logical work domain A (whether or not user is an administrator or a developer) and the types of accessible resources by the user qualification managing data bases 12, and thereby protect the security of the resources. The "admin" in the figure means an administrator.

By setting the project data base PRJDB 13 as the input and output of the tools activated in the logical work domains, it is possible to automatically control the input/output directories of the necessary resources without user intervention.

Figure 22:
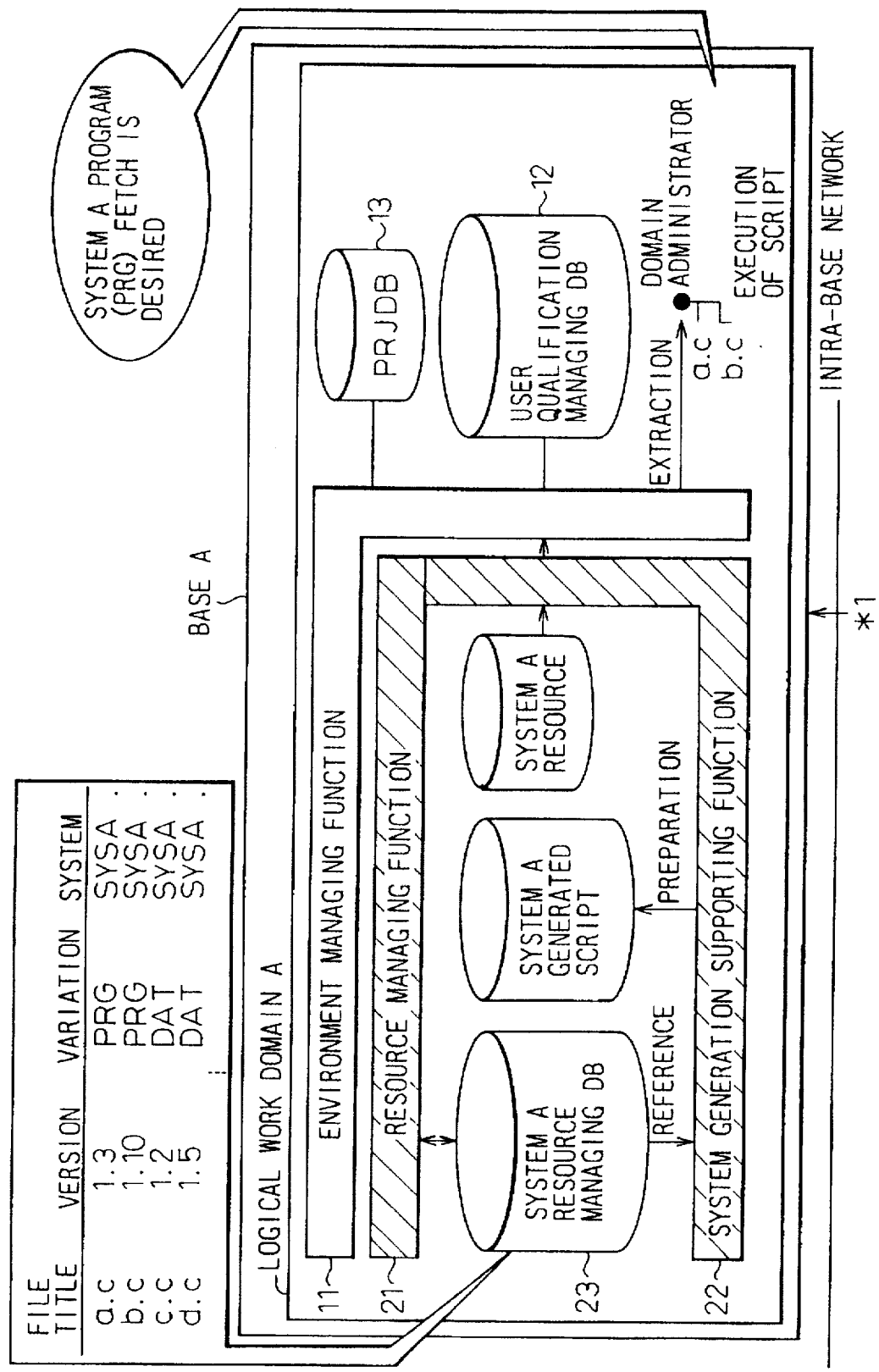
FIG. 22 is a view (part 1) of a detailed example of the configuration of FIG. 5 and FIG. 6.
Figure 23:
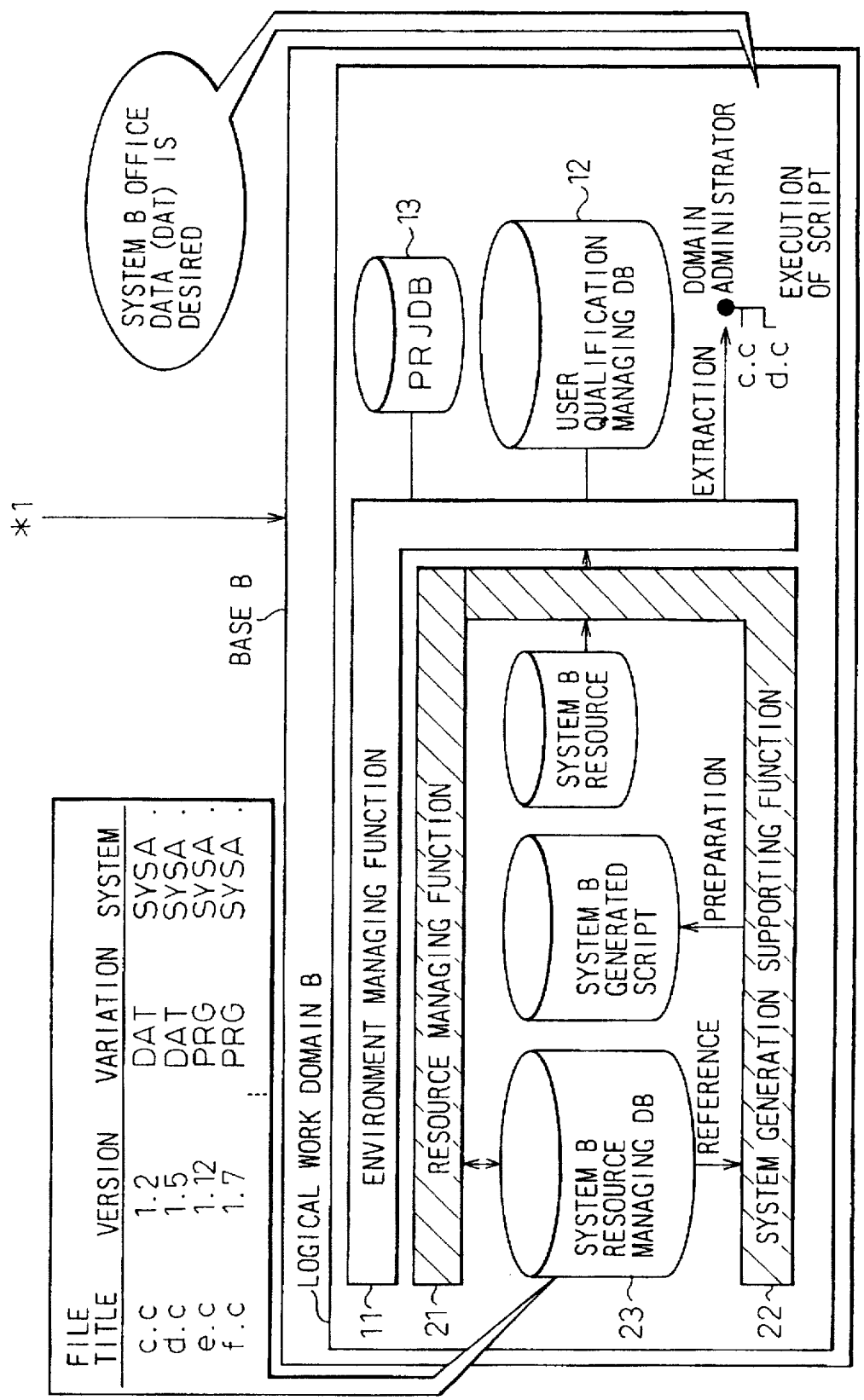
FIG. 23 is a view (part 2) of a detailed example of the configuration of FIG. 5 and FIG. 6.

FIG. 22 and FIG. 23 are views of a detailed example of the configuration of FIG. 5 and FIG. 6.

Assume for example that the logical work domain A of the base A is for the development of the system A and the logical work domain B of the base B is for the development of the system B. Each of the logical work domains A and B is provided with a resource managing functional unit 21 and a system generation support functional unit 22. The logical work domains A and B manage the names of the resources they hold, the version numbers, the program/data, and other variation attributes, the system attributes, the CPU attributes, the loading attributes, the save attributes, etc. in the resource managing data bases 23 of the resource managing functional units 21. Here, assuming that the domain administrator at the logical work domain A designates that he wishes to "take out resources corresponding to the program of the system A" for generation of the system A, the system generation support functional unit 22 refers to the resource managing data base 23 of the resource managing functional unit 21, selects the corresponding resources from the file name a.c in the figure, confirms the location of the resources by the project data base PRJDB 13 of the environment managing functional unit 11, and confirms the right of access by the user qualification managing data base 12. Then, it extracts the necessary resources from the locations, checks the appropriateness as components of the software system, and then prepares a system generating script. The domain administrator can easily prepare the software system by executing the script. Note that the PRG in the figure is an abbreviation for "program", DAT "data", and SYS "system".

Figure 24:
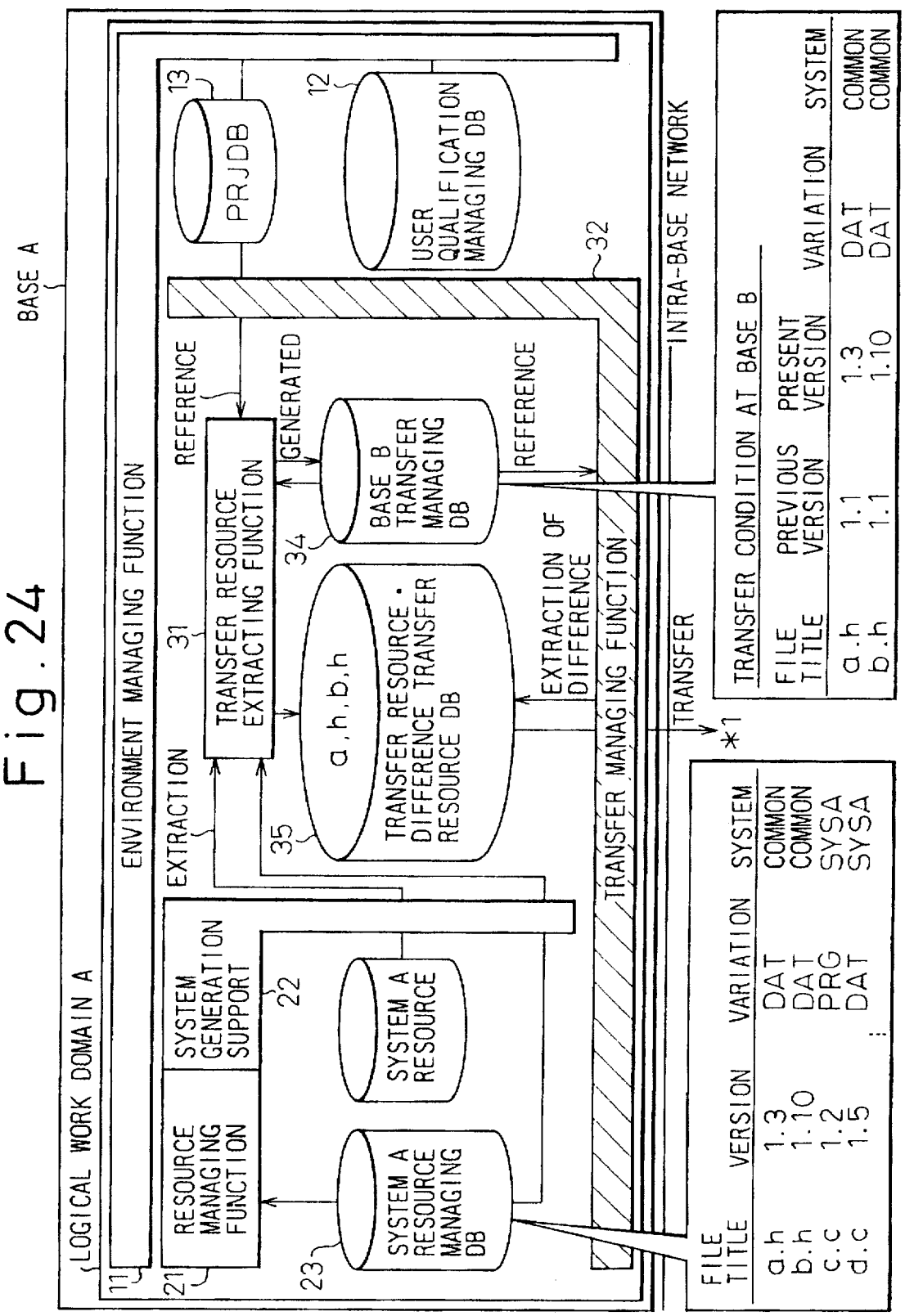
FIG. 24 is a view (part 1) of a detailed example of the configuration of FIG. 7 and FIG. 8.
Figure 25:
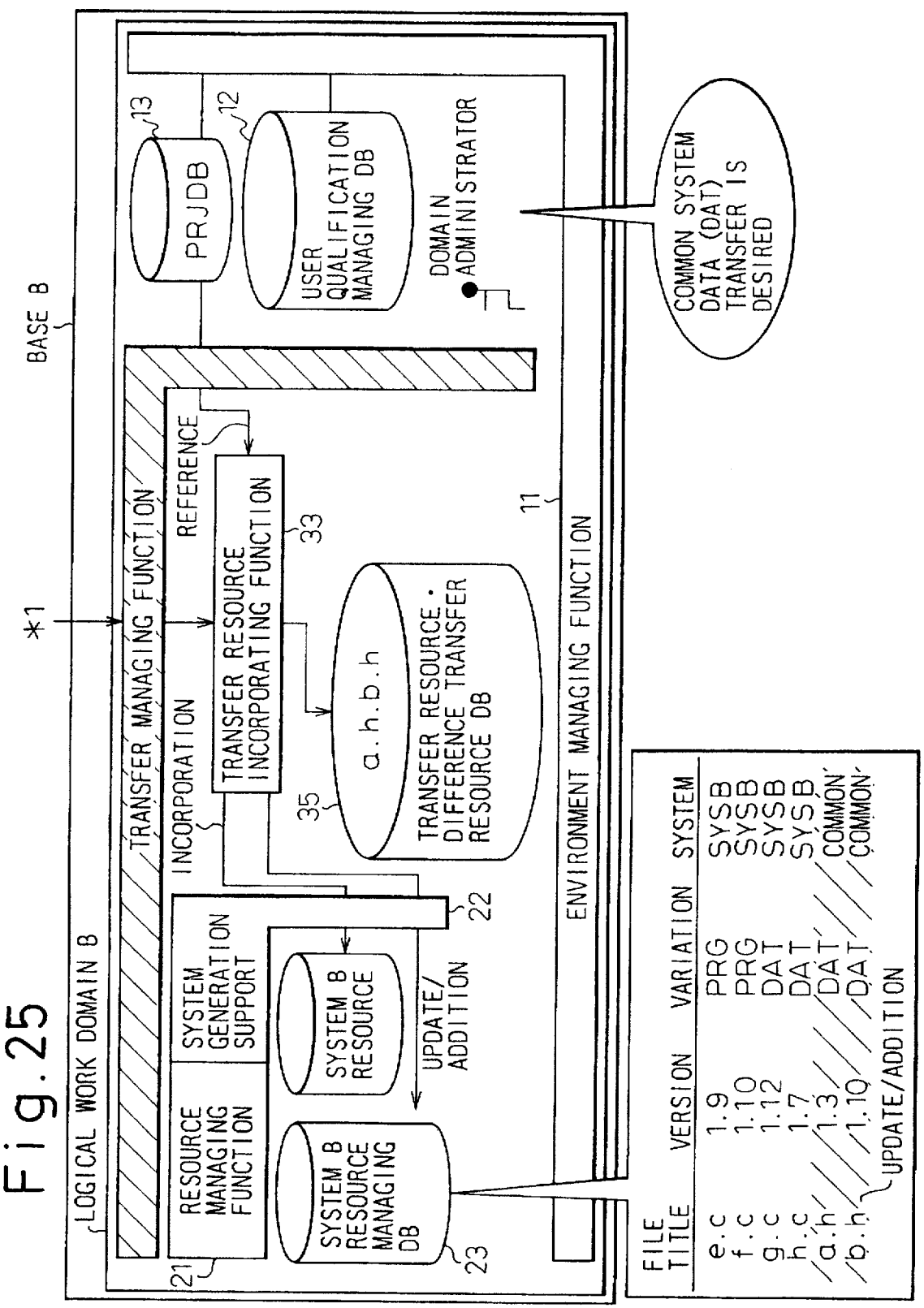
FIG. 25 is a view (part 2) of a detailed example of the configuration of FIG. 7 and FIG. 8.

FIG. 24 and FIG. 25 are views of a detailed example of the configuration of FIG. 7 and FIG. 8.

Assume for example that the logical work domain A of the base A is for development of the system A and the logical work domain B of the base B is for development of the system B. Here, assuming that the logical work domain B of the base B designates that it wishes to "transfer the resources corresponding to the data of the common systems common to both the system A and the system B from the resources held at the logical work domain A of the base A", it confirms the qualification of the party requesting the transfer of resources by the user qualification managing data base 12 of the environment managing functional unit 11 of the logical work domain A. After this, it selects the corresponding resources by the transfer resource extraction functional unit 31, confirms the location of the resources by the project data base PRJDB 13 of the environment managing functional unit 11, prompts the system generation support functional unit 22 to extract the resources, prepares the transfer resources, and prepares the base B transfer managing data base 34.

Next, it transfers the resources to the base B by the transfer managing functional unit 32. If a second or later transfer at this time, it refers to the transfer managing data base 34, finds the resources with version numbers changed from the version of the time of the previous transfer from among the transfer resources, extracts only the differences between versions, and transfers the differences. In the illustrated example, the file names a.h and b.h are changed from the version number 1.1 to 1.3 and the version number 1.1 to 1.10, respectively. After the resources are transferred to the base B, it refers to the project data base PRJDB 13 of the environment managing functional unit 11 by the transfer resource incorporating functional unit 33 in the logical work domain B, confirms the location of incorporation of the transfer resources, incorporates the resources transferred from the base A to the resources of that location, and at the same time updates the resource managing data base 34 to the latest state or adds information to the same.

Note that reference numeral 35 is a transfer resource/ difference transfer resource data base which transfers all resources or transfers just differences (relating to a.h and b.h in the above example).

Figure 26:
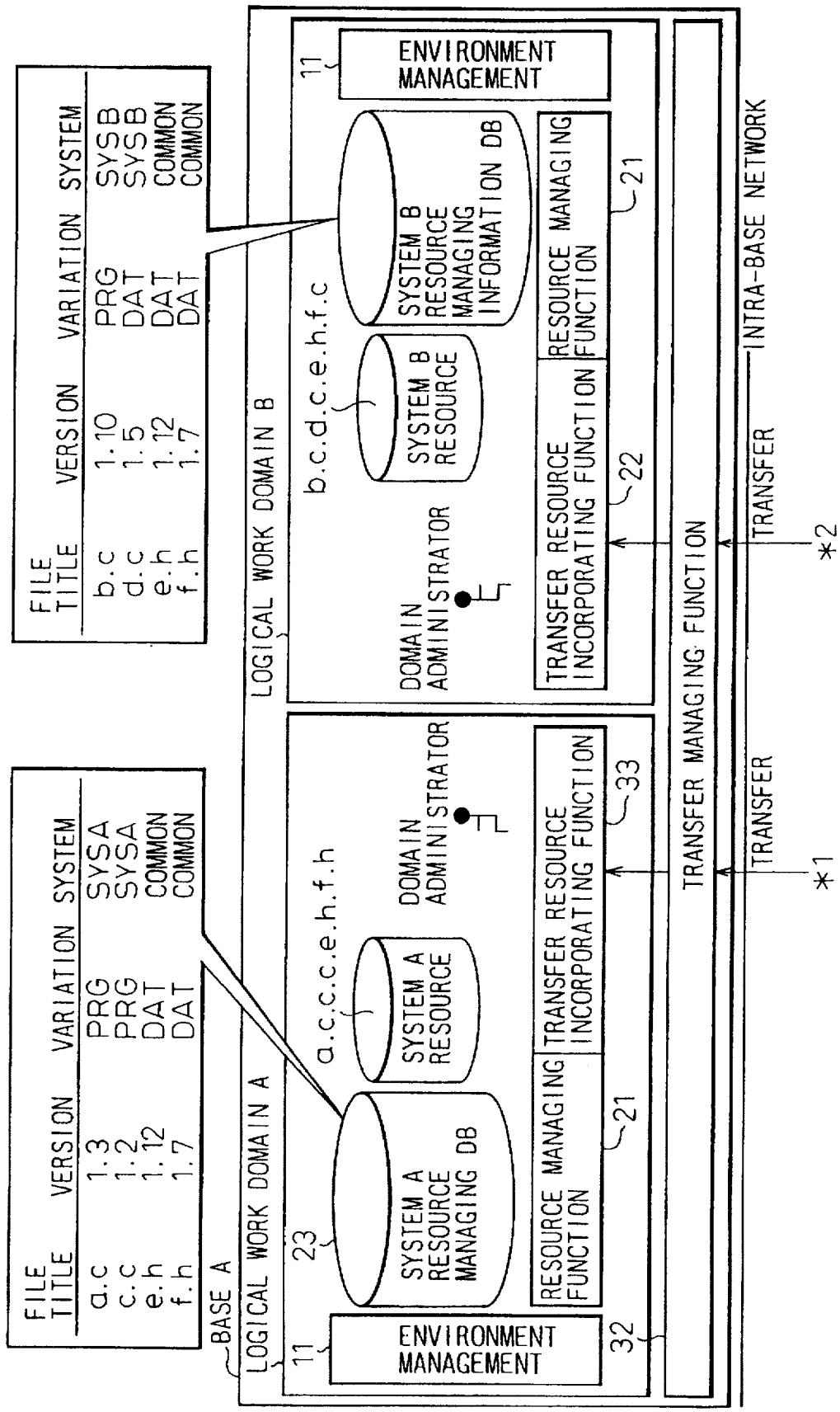
FIG. 26 is a view (part 1) of a detailed example of the configuration of FIG. 9 and FIG. 10.
Figure 27:
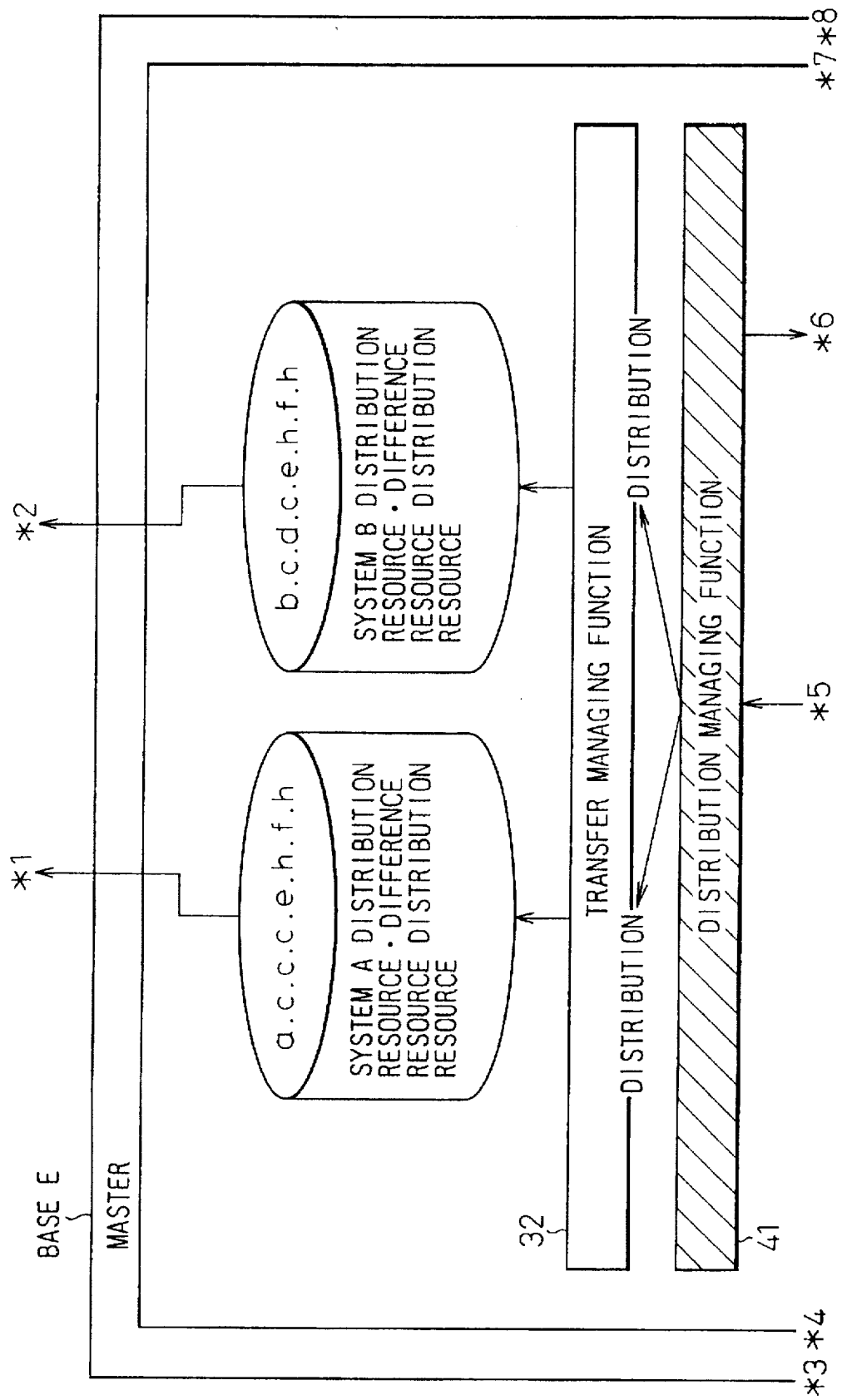
FIG. 27 is a view (part 2) of a detailed example of the configuration of FIG. 9 and FIG. 10.
Figure 28:
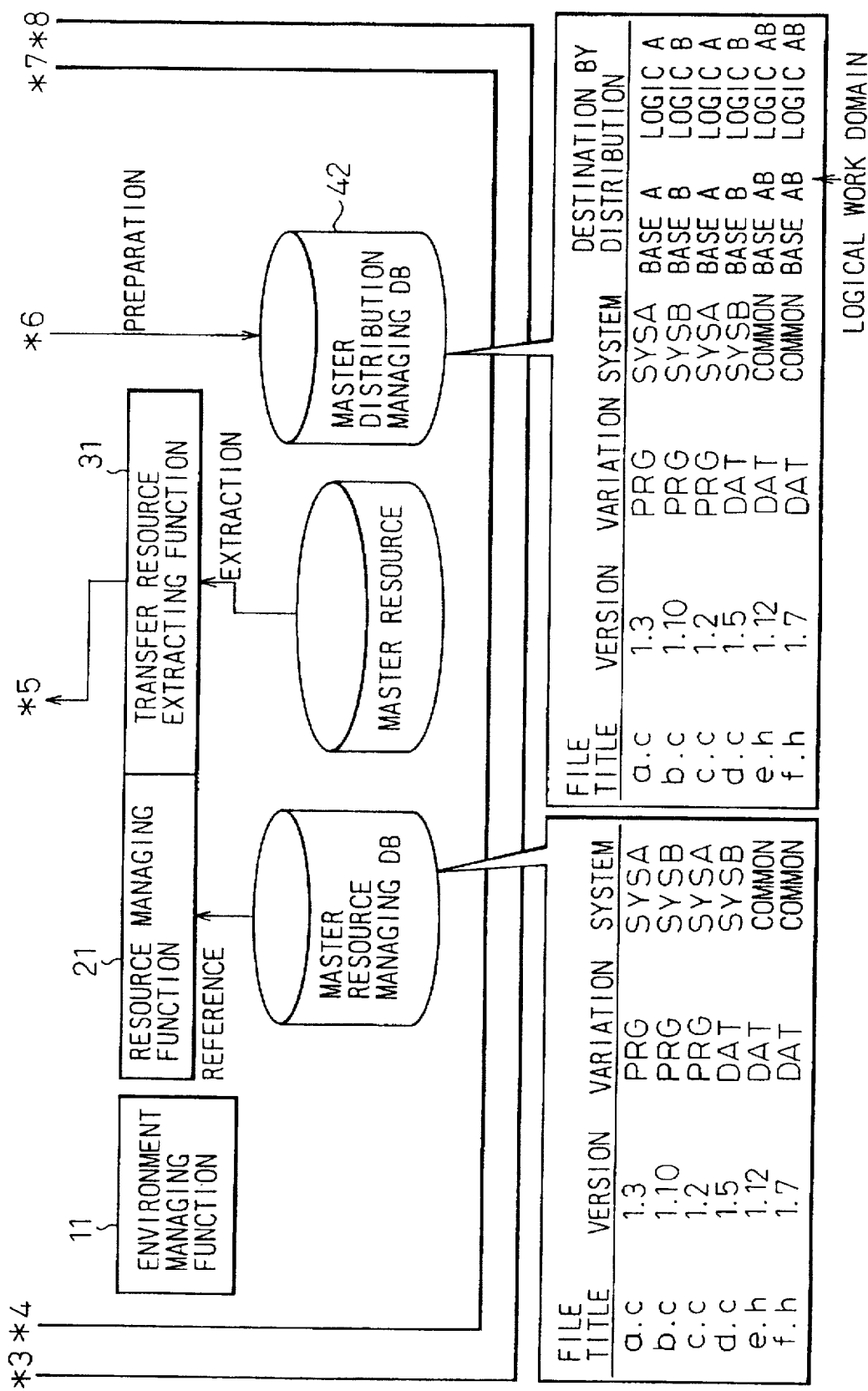
FIG. 28 is a view (part 3) of a detailed example of the configuration of FIG. 9 and FIG. 10.

FIG. 26, FIG. 27, and FIG. 28 are views of a detailed example of the configuration of FIG. 9 and FIG. 10.

Assume for example that the base A is realized by the group unit logical work domain A for development of the system A and the group unit logical work domain B for development of the system B and that the other base E is realized by the master layer for storing the resources of the integrated project. Here, assume that resources required for development are being distributed to the logical work domains A and B of the base A so as to start development of a new software system. The domain administrators of the logical work domains A and B of the base A activate the master layer distribution managing functional unit 41. The distribution managing functional unit 41 confirms the qualifications of the domain administrators by the qualification managing data base of the master layer environment managing functional unit 11 and refers to the resource managing data base 23 of the resource managing functional unit 21 to select the resources required by the logical work domains A and B, prompts the extraction of the resources at the resource managing functional unit 21, and prepares the distribution resources for each destination (logical work domains A and B). At the same time, it prepares a master distribution managing data base 42 for managing the state of distribution based on the resource managing data base 23 of the master layer. Next, the master layer transfer managing functional unit 11 transfers the distribution resources to the transfer destinations, and the transfer managing functional unit 32 and transfer resource incorporating functional unit 22 in the logical work domains A and B of the base A store the resources in the logical work domains A and B and at the same time update the resource managing data bases 23 of the logical work domains to the latest state or add information to the same. Note that the figure shows the case where the file names e.h and f.h are common to both the logical work domains A and B.

Figure 29:
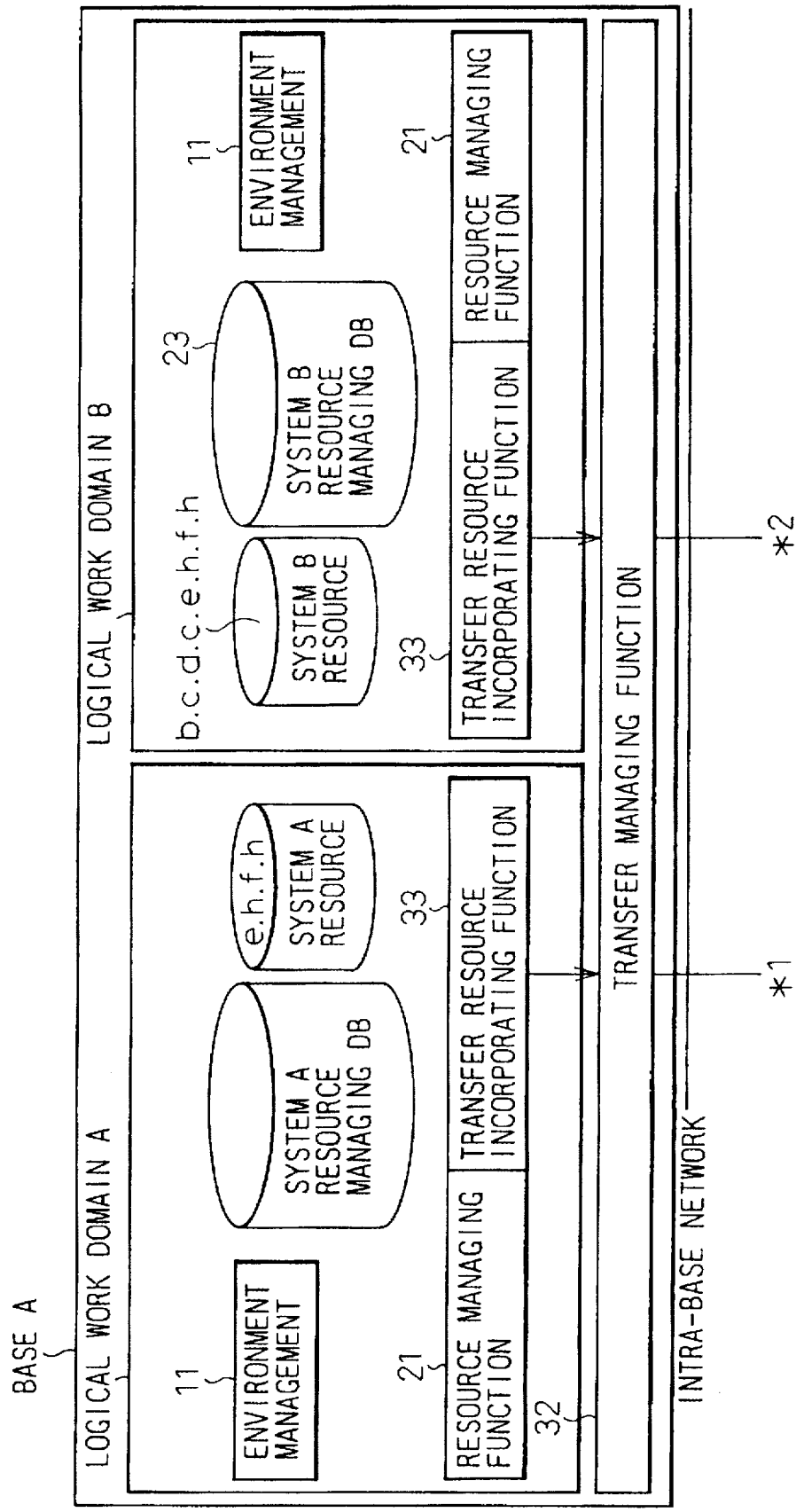
FIG. 29 is a view (part 1) of a detailed example of the configuration of FIG. 11 and FIG. 12.
Figure 30:
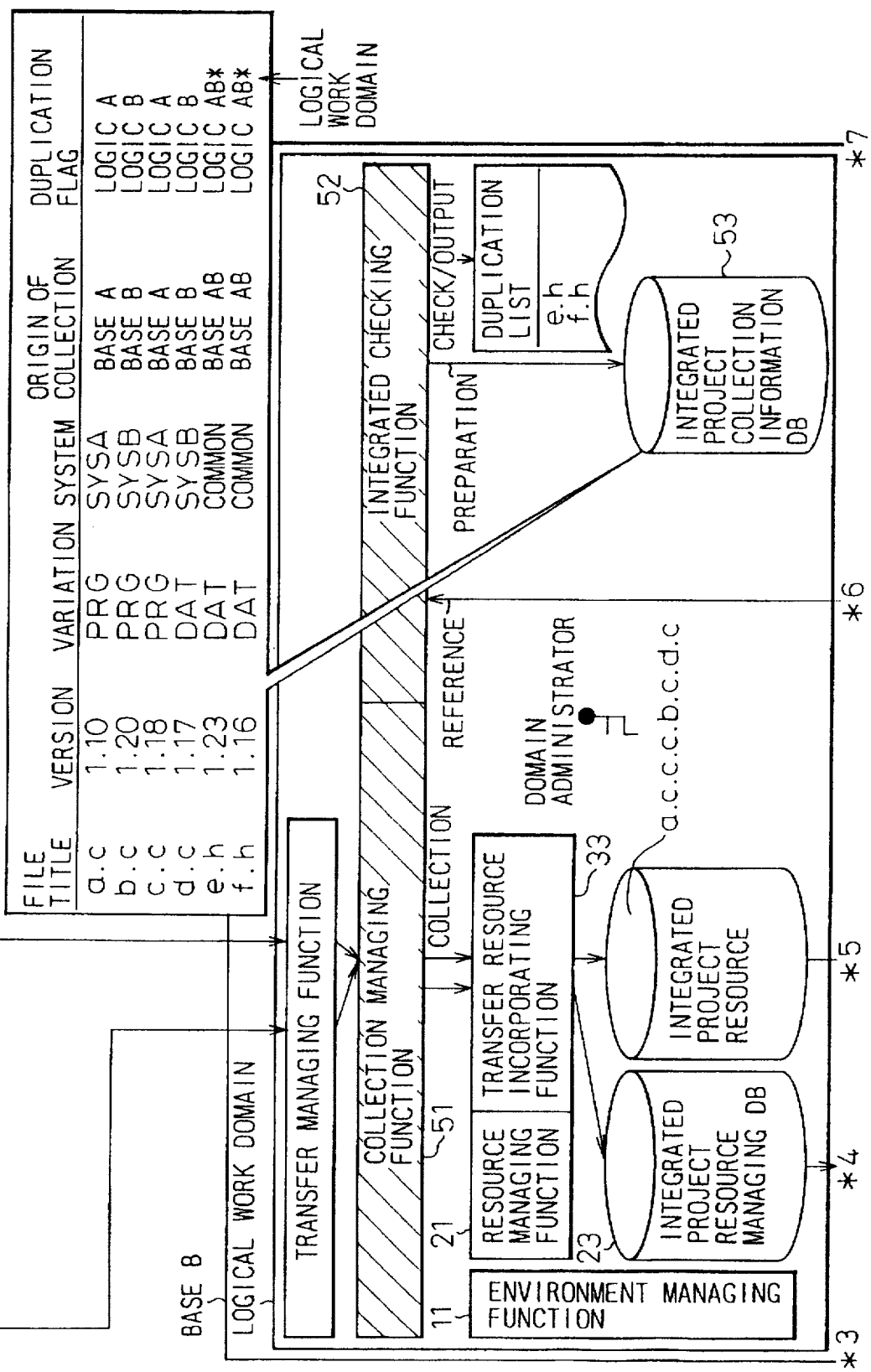
FIG. 30 is a view (part 2) of a detailed example of the configuration of FIG. 11 and FIG. 12.
Figure 31:
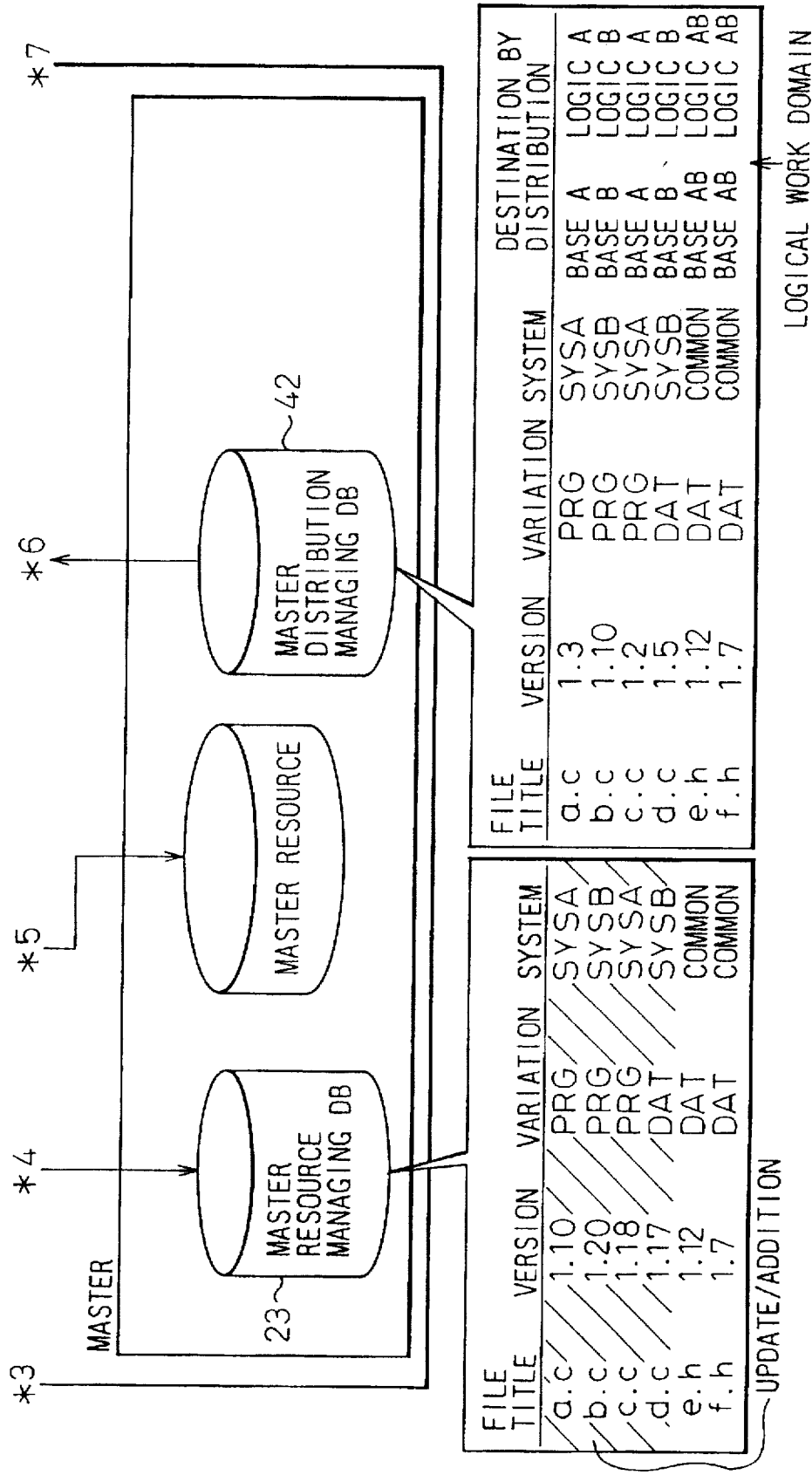
FIG. 31 is a view (part 3) of a detailed example of the configuration of FIG. 11 and FIG. 12.

FIG. 29, FIG. 30, and FIG. 31 are views of a detailed example of the configuration of FIG. 11 and FIG. 12.

For example, assume that the base A is realized by the group unit logical work domain A for development of the system A and the group unit logical work domain B for development of the system B and that the other base B is realized by the master layer for storing the resources of the integrated project. Assume further that the combined system test has been completed at the logical work domains A and B of the base A and the resources are to be collected at the logical work domain of the base B. First, the domain administrator for the logical work domain of the integrated project at the base B activates the collection managing functional unit 51. The collection managing functional unit 51 first uses the integrated check functional unit 52 to refer to the distribution managing data base 42 prepared previously at the time of the distribution of resources and prepare the collection information data base 53 for managing the resources to be collected and, simultaneously, checks for resources distributed in duplicate and outputs a check list of the same ("duplication list" in FIG. 30). The collection managing functional unit 51 refers to the collection information data base 53, the transfer managing functional unit 32 transfers only the resources which are not duplicated from the logical work domain of the base A to which they were sent, and the transfer resource incorporating functional unit 33 incorporates the resources into the integrated project. At the same time, the resource managing data base 23 of the integrated project is updated to the latest state or information is added to it.

After the combined integrated project test is completed, the resources of the integrated project are moved to and frozen at the logical work domain at the master layer (M). At the same time, the master resource managing data base 23 is updated to the latest state or information is added.

Referring to FIG. 29, FIG. 30, and FIG. 31, the software modules of the file names e.h and f.h are distributed in duplicate from the base B to the logical work domain A and the logical work domain B at the base A. Therefore, there is the chance of the software modules e.h and f.h being modified differently due to individual development work at the logical work domains A and B. If this happens, there is the chance of a contradiction occurring between the two when integrated at the master layer.

Therefore, these resources are marked with the asterisks at the duplication flag shown in FIG. 30 and any contradictions found are eliminated manually etc.

Figure 32:
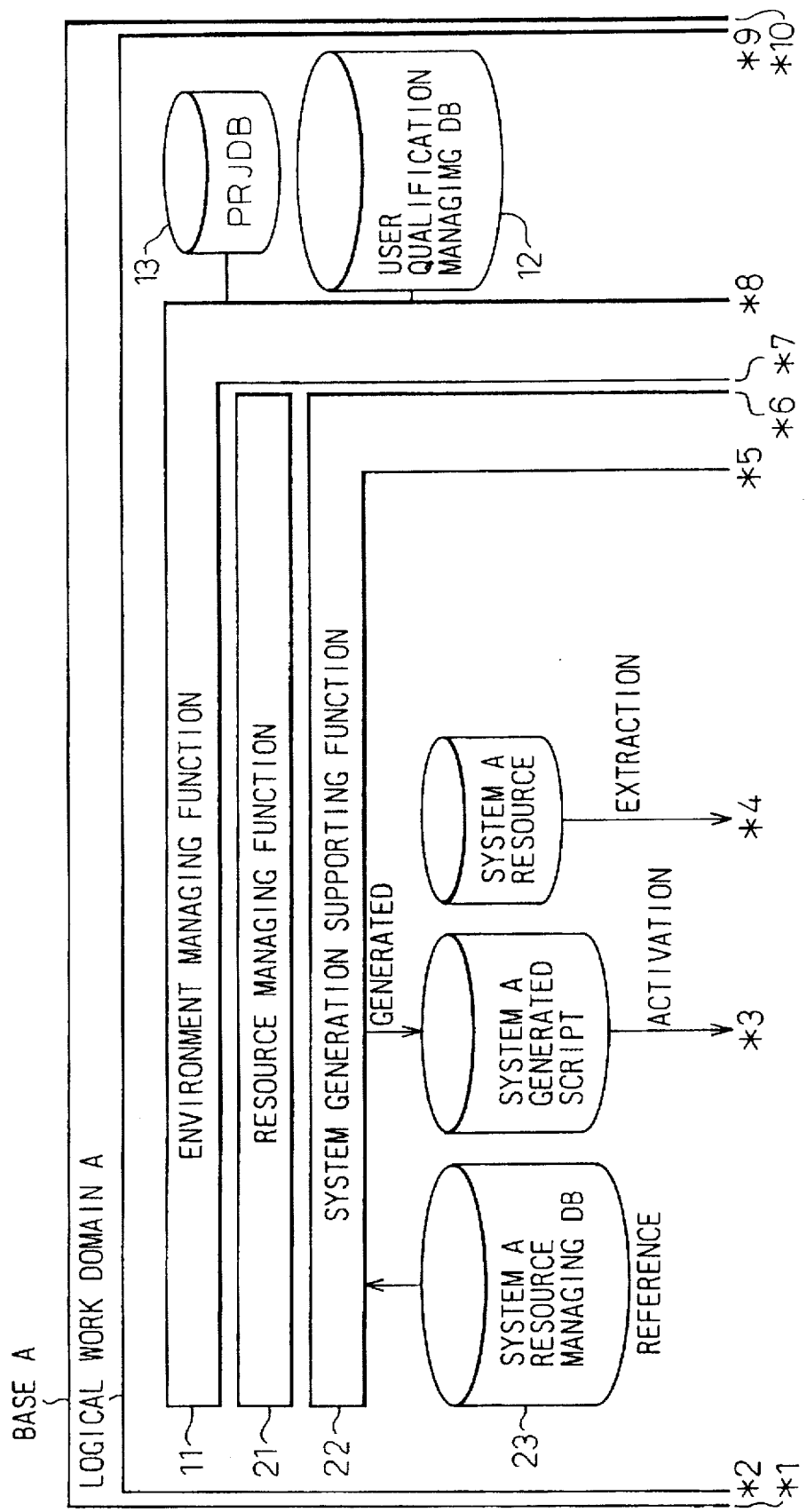
FIG. 32 is a view (part 1) of a detailed example of the configuration of FIG. 13 and FIG. 14.
Figure 33:
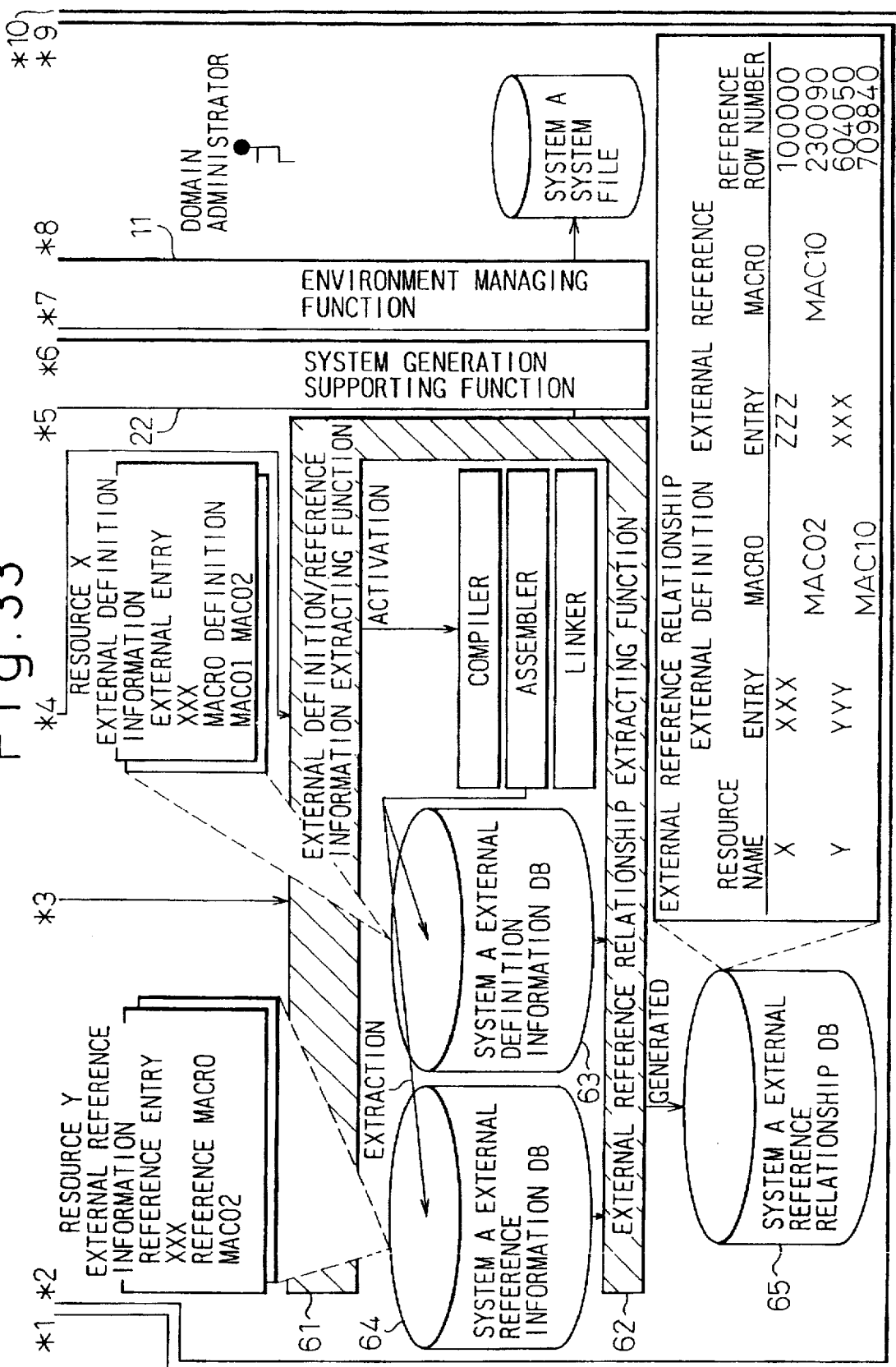
FIG. 33 is a view (part 2) of a detailed example of the configuration of FIG. 13 and FIG. 14.

FIG. 32 and FIG. 33 are views of a detailed example of the configuration of FIG. 13 and FIG. 14.

Assume for example that the logical work domain A of the base A is supposed to develop a system A. This logical work domain A is provided with an environment managing functional unit 11, a resource managing functional unit 21, and a system generation support functional unit 22. The system generation support functional unit 22 generates script for generation of the system A. The script includes an activation script by the external definition/reference information extraction functional unit 61 and external reference relationship extraction functional unit 62. When the domain administrator of the logical work domain A activates the script, the external definition/reference information extraction functional unit 61 is activated, and the compiler, assembler, and linker are successively activated to generate the system A from the functional unit 61. The external definition/ reference information extraction functional unit 61 gives parameters for extraction of the external definition information and external reference information to the assembler and stores the information in the external definition information data base 63 and external reference information data base 64. Next, the external reference relationship extraction functional unit 62 compares the data base 63 and data base 64, edits the external reference relationships, and stores the result in the external reference relationship data base 65.

The bottom part of FIG. 33 shows an example of the content of the external reference relationship data base 5. X and Y are resource names, XXX and YYY are external entry names of external definition information, MAC02 and MAC10 are macro names of external definition information, and ZZZ is the external entry name of the external reference information for the resource X. Further, "100000" etc. is the row number referred to.

Figure 34:
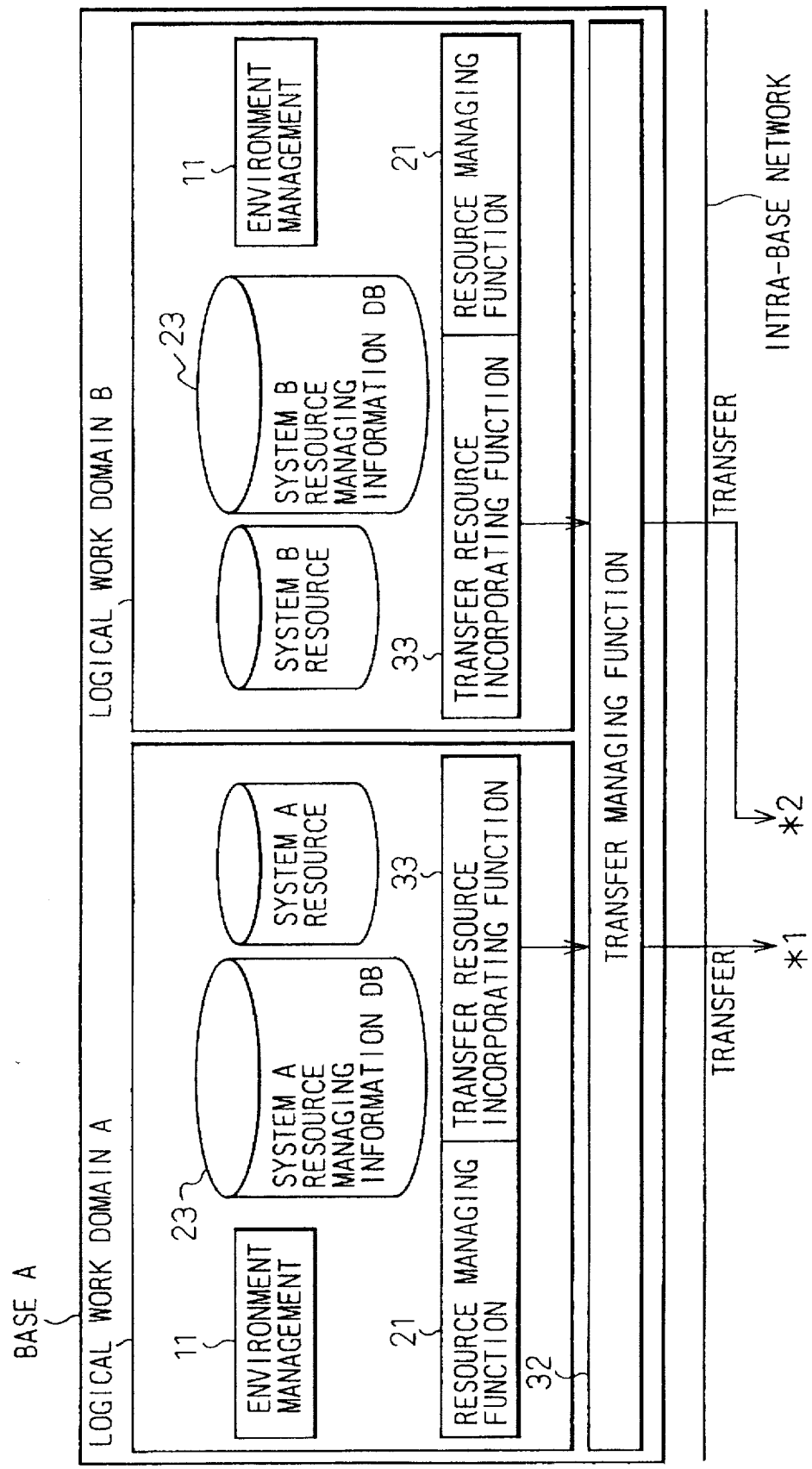
FIG. 34 is a view (part 1) of a detailed example of the configuration of FIG. 15 and FIG. 16.
Figure 35:
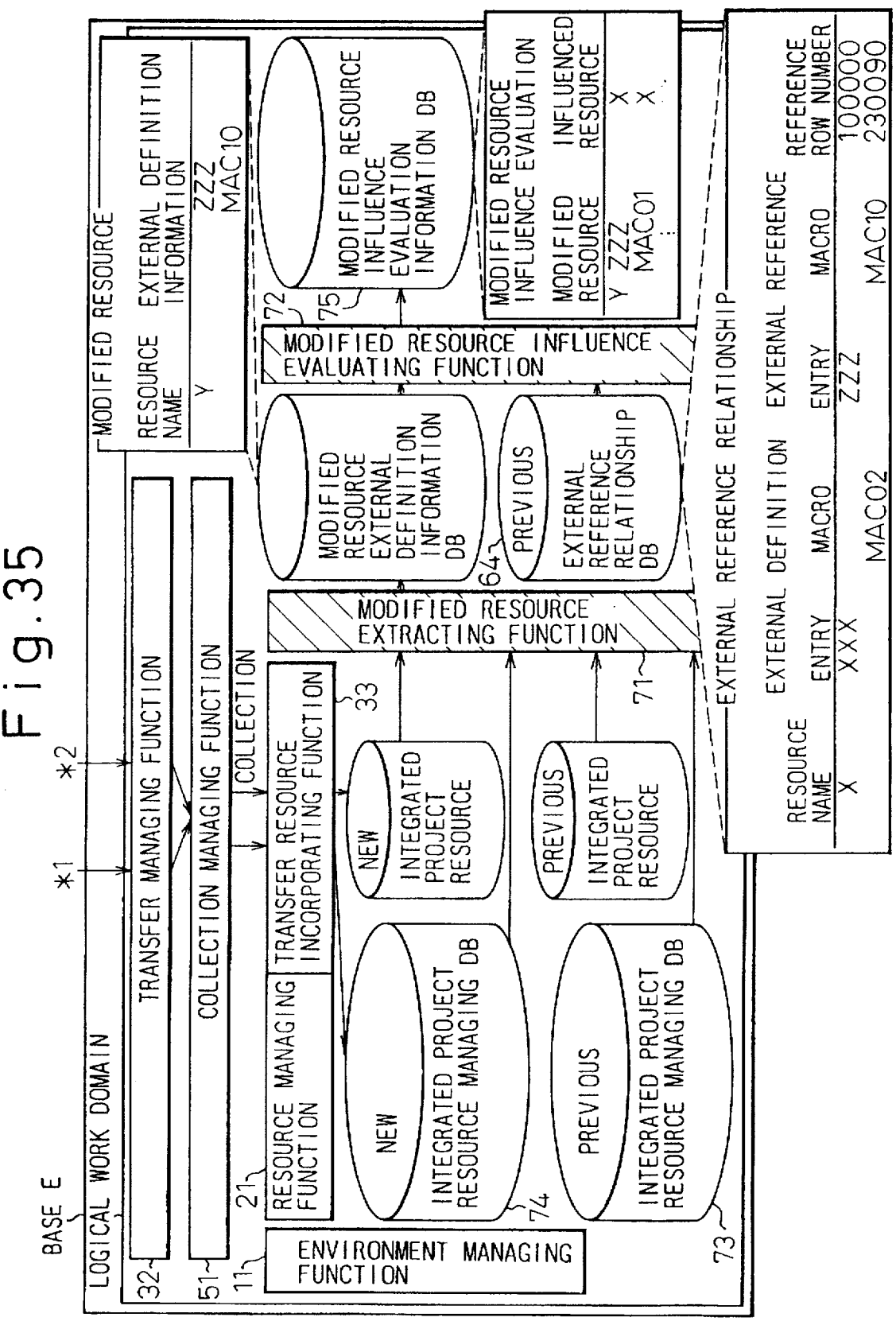
FIG. 35 is a view (part 2) of a detailed example of the configuration of FIG. 15 and FIG. 16.

FIG. 34 and FIG. 25 are views of a detailed example of the configuration of FIG. 15 and FIG. 16.

For example, assume the base A is comprised of the group unit logical work domain A for development of the system A and the group unit logical work domain B for development of the system B, the base E is realized by the logical work domain for storing the resources of the integrated project, and that the project resources are collected from the logical work domains A and B of the base A at the logical work domain of the base B. In this case, by comparing the project resources integrated by the collection from the current base A and the resources of the project before distribution to the base A side by the resource managing data bases 73 and 74, the modified resource extraction functional unit 71 takes out the modified resources and the newly added resources. Further, the modified resource influence evaluating functional unit 72 reassembles just the modified resources and newly added resources so as to take out the external definition information and compares this with the external reference relationship data base 64 prepared before the distribution to the base A side so as to output the information on the resources requiring redoing due to reference to the modified resources to the modified resource influence evaluating data base 75.

In the development environment realized by the first embodiment (FIG. 1), since it is possible to view the overall development environment on the scale of three hierarchies of the personal layers (P), group layers (G), and master layer (M) in accordance with the level of work, it is possible to prevent the isolation of bases which tended to occur in the old distributed development environments and enable centralized management of entire projects. Further, the development environment is not limited as to the size of the project or the physical distribution, so enables project expansions, movement of some operations to the suburbs etc., and addition of facilities to be flexibly dealt with.

In the development environment realized by the second embodiment (FIG. 2, FIG. 3, and FIG. 17 to FIG. 19), it is possible to grasp the work on further smaller scales by allocating logical work domains in units of development environments of the software system to be developed. Therefore, project management and resource management at the level of development of a software system become easy. Further, it becomes possible to flexibly cope with changes without regard as to the overall project development system.

In the development environment realized by the third embodiment (FIG. 4, FIG. 20, and FIG. 21), by managing the locations of resources in the logical work domains, it is possible to automatically control the complex input/output information of the activated tools without involving the user. Further, by protecting the security of the resources, it is possible to prevent destruction of resources or mistaken operation of tools.

In the development environment realized by the fourth embodiment (FIG. 5, FIG. 6, FIG. 22, and FIG. 23), by managing the attributes of the resources in the logical work domains, it becomes possible to provide information on the components of the software system and thereby to facilitate the construction of the software system. Further, it is possible to use this information to automatically extract the resources required for the construction of the software system and ensure the appropriateness of the components and to smoothly prepare a software system with a high quality.

In the development environment realized by the fifth embodiment (FIG. 7, FIG. 8, FIG. 24, and FIG. 25), it becomes possible to transfer resources among logical work domains without omission and to keep the resource information constantly up to date.

Further, since provision is made of a function for extraction of differences between previous transfer data and present transfer data, it is possible to minimize the amount of resources transferred and to transfer resources efficiently. Note that this technique can be applied without regard as the physical distribution.

In the development environment realized by the sixth embodiment (FIG. 9, FIG. 10, FIG. 26 to FIG. 28), it becomes possible to distribute the set of resources forming the development base required for the logical work domains of the group layers (G) without omission from the master of the master layer (M). Further, by using the transfer managing functional unit 32 at the time of the distribution, it becomes possible to efficiently distribute the resources by transfer of only differences without regard as to the physical distribution.

In the development environment realized by the seventh embodiment (FIG. 11, FIG. 12, FIG. 29 to FIG. 31), it becomes possible to integrate the resources distributed to the group layers (G) at a logical work domain at the master layer (M). Further, by checking the state of duplication of the resources which have been distributed, it is possible to prevent any lack of consistency liable to occur at the time of integrating resources.

In the development environment realized by the eighth and ninth embodiments (FIG. 13 to FIG. 16 and FIG. 32 to FIG. 35), when a relatively large scale software system is generated by distribution and then collection in the sixth and seventh embodiments, by providing information on the resources which have been modified and information on the resources which have been indirectly influenced by the same, it becomes possible to redo only the resources requiring modification, i.e., not redo all of the large-sized software, and thereby sharply reduce the tremendous amount of work involved in the system generation.

I claim:

1. A system for managing software development in a distributed development environment which integrates a plurality of resources prepared at a plurality of distributed bases into a software system, which prepares the integrated software system by personal layers (P) including logical hierarchies for performing work for development and management of individual resources on an individual level, group layers (G) including logical hierarchies for performing work for development and management of subsystem resources by groups receiving the individual resources developed at the personal layers (P), and a master layer (M) including a logical hierarchy for performing work for development and management of integrated project system resources by a project receiving the subsystem resources developed at the group layers (G), wherein logical work domains are set for generating software modules in respective distributed bases for each of the succession of development environments appearing in the process of development of the software system and wherein these logical work domains are allocated to the corresponding personal layers (P), group layers (G), and master layer (M).

2. A system for managing software development as set forth in claim 1, wherein each logical work domain has an environment managing functional unit for performing the function of managing the locations of resources held by the logical work domain in accordance with the type of the resources and the function of managing whether or not users accessing the resources have the qualifications for being allowed access to the resources.

3. A system for managing software development as set forth in claim 1, wherein each logical work domain has a resource managing functional unit for managing the content and attributes of the resources held by the logical work domain as resource managing information and a system generation support functional unit for automatically extracting components of the software based on the resource managing information and automatically generating system generation script while checking the appropriateness of the same and the allocation logic.

4. A system for managing software development as set forth in claim 1, wherein the logical work domain has a transfer resource extracting functional unit for automatically extracting resources for which transfer has been requested from one logical work domain by another logical work domain, a transfer managing functional unit for automatically transferring resources between one logical work domain and another logical work domain, and a transfer resource incorporating functional unit for automatically incorporating into the other logical work domain resources which have been transferred from that one logical work domain and said transfer resource extracting functional unit and said transfer resource incorporating functional unit transfer just the difference with the previous resource in the second and later transfers of the resource.

5. A system for managing software development as set forth in claim 1, wherein the master layer (M) has a distribution managing functional unit for performing the function of taking out from the resources managed by the master layer (M) the software systems required by the logical work domains of the group layers (G) and distributing the same and the function of managing the state of distribution of the same when starting work for development of a software system.

6. A system for managing software development as set forth in claim 1, wherein the master layer (M) has a collection managing functional unit for collecting and managing at the logical work domain in the master layer (M) the developed resources from the group layers (G) at the point of time when the development of the resources distributed from the master layer (M) to a plurality of group layers (G) is completed and an integrated checking functional unit for performing the function of integrating the developed resources obtained through the collection managing functional unit and the function of checking the coordination of the resources developed in duplicate by the plurality of group layers (G).

7. A system for managing software development as set forth in claim 1, wherein each logical work domain has an external definition/reference information extracting functional unit for extracting the external definition information and external reference information of the resources at the time of developing the resources and an external reference relationship extracting functional unit for performing the function of sifting through the reference relationships of the resources based on the extracted external definition information and external reference information.

8. A system for managing software development as set forth in claim 1, wherein the logical work domain has a modified resource extracting functional unit for extracting resources in which modifications have occurred along with the development of the resources and newly added resources and a modified resource influence evaluating functional unit for generating influenced resource information indicating resources which have to be redone due to reference to the resources in which modifications have occurred.

* * * * *